(12) United States Patent
Ujiie et al.

(10) Patent No.: US 11,966,458 B2
(45) Date of Patent: Apr. 23, 2024

(54) AUTHENTICATION METHOD, AUTHENTICATION SYSTEM, AND AUTHENTICATION DEVICE

(71) Applicant: Panasonic Intellectual Property Corporation of America, Torrance, CA (US)

(72) Inventors: Yoshihiro Ujiie, Osaka (JP); Hideki Matsushima, Tokyo (JP); Makoto Fujiwara, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 280 days.

(21) Appl. No.: 17/381,397

(22) Filed: Jul. 21, 2021

(65) Prior Publication Data

US 2021/0349981 A1   Nov. 11, 2021

Related U.S. Application Data

(63) Continuation of application No. PCT/JP2020/031591, filed on Aug. 21, 2020.

(30) Foreign Application Priority Data

Aug. 30, 2019   (JP) ................. 2019-158644

(51) Int. Cl.
 *G06F 21/33* (2013.01)
 *G06F 21/44* (2013.01)
(52) U.S. Cl.
 CPC .............. *G06F 21/33* (2013.01); *G06F 21/44* (2013.01)

(58) Field of Classification Search
 CPC ................................. G06F 21/33; G06F 21/44
 See application file for complete search history.

(56) References Cited

U.S. PATENT DOCUMENTS

| 9,654,968 | B2 * | 5/2017 | Peeters | ................. | H04L 9/0822 |
| 10,210,333 | B2 * | 2/2019 | Smith, II | .............. | H04L 9/0897 |

(Continued)

FOREIGN PATENT DOCUMENTS

| EP | 3086505 | 10/2016 |
| EP | 3219553 | 9/2017 |
| JP | 2019-026067 | 2/2019 |

OTHER PUBLICATIONS

Extended European Search Report dated Sep. 19, 2022 issued in European patent application No. 20857326.1.

(Continued)

*Primary Examiner* — Yonas A Bayou
(74) *Attorney, Agent, or Firm* — GREENBLUM & BERNSTEIN, P.L.C.

(57) ABSTRACT

An authentication method is used by an automated driving system that includes a vehicle and an external device, the external device communicating with the vehicle to cause the vehicle to implement automated driving. The vehicle holds a first certificate that certifies validity of the vehicle. The external device holds a second certificate that certifies validity of the external device. The authentication method includes: validating a third certificate that certifies validity of a combination of the vehicle and the external device, in accordance with a result of device authentication performed between the vehicle and the external device by reference to the first certificate and the second certificate.

14 Claims, 28 Drawing Sheets

(56) References Cited

U.S. PATENT DOCUMENTS

| | | | |
|---|---|---|---|
| 10,286,558 B1* | 5/2019 | Asada | B25J 13/003 |
| 11,062,052 B2* | 7/2021 | Shanmugam | G06F 16/258 |
| 2015/0072726 A1* | 3/2015 | Stern | H04W 88/06 |
| | | | 455/552.1 |
| 2015/0134968 A1* | 5/2015 | Outwater | B60L 53/68 |
| | | | 340/5.6 |
| 2016/0033966 A1* | 2/2016 | Farris | A47G 29/122 |
| | | | 701/16 |
| 2016/0099814 A1* | 4/2016 | Negi | H04L 9/3268 |
| | | | 713/171 |
| 2016/0140496 A1* | 5/2016 | Simms | B64C 39/024 |
| | | | 705/337 |
| 2017/0161680 A1* | 6/2017 | Hong | G07F 17/13 |
| 2018/0351941 A1* | 12/2018 | Chhabra | H04L 63/08 |
| 2020/0198620 A1 | 6/2020 | Nakata | |

OTHER PUBLICATIONS

"Taxonomy and Definitions for Terms Related to Driving Automation Systems for On-Road Motor Vehicles", SAE International, J3016, Jun. 2018, pp. 1-35.

International Search Report issued in International Pat. Appl. No. PCT/JP2020/031591, dated Oct. 20, 2020, along with an English translation thereof.

* cited by examiner

FIG. 6

| Certificate ID | Driving automation level | Device ID | State |
|---|---|---|---|
| 1 | Lv.3 | XXX | Valid |
| 2 | Lv.4 | YYY | Invalid |
| 3 | Lv.5 | ZZZ | Invalid |

FIG. 17

| Certificate ID | Driving automation level | Vehicle ID | Device ID | State |
|---|---|---|---|---|
| 1 | Lv.3 | AAA | XXX | Valid |
| 2 | Lv.4 | AAA | YYY | Invalid |
| 3 | Lv.5 | AAA | ZZZ | Invalid |
| 4 | Lv.3 | BBB | XXX | Invalid |
| 5 | Lv.4 | BBB | YYY | Invalid |
| 6 | Lv.5 | BBB | ZZZ | Valid |
| 7 | Lv.3 | CCC | XXX | Invalid |
| 8 | Lv.4 | CCC | YYY | Valid |

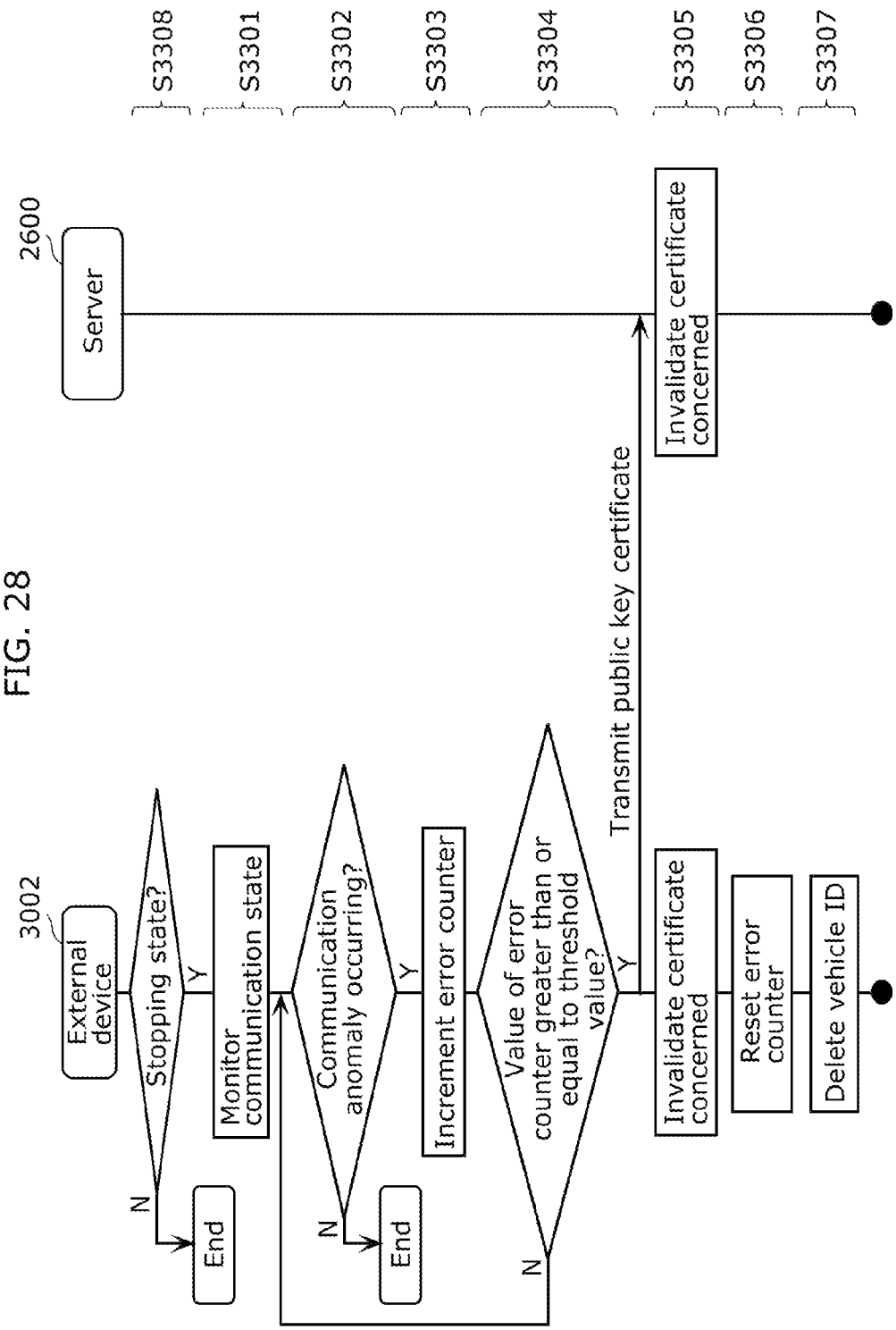

AUTHENTICATION METHOD, AUTHENTICATION SYSTEM, AND AUTHENTICATION DEVICE

CROSS REFERENCE TO RELATED APPLICATION(S)

This is a continuation application of PCT International Application No. PCT/JP2020/031591 filed on Aug. 21, 2020, designating the United States of America, which is based on and claims priority of Japanese Patent Application No. 2019-158644 filed on Aug. 30, 2019. The entire disclosures of the above-identified applications, including the specifications, drawings and claims are incorporated herein by reference in their entirety.

FIELD

The present disclosure relates to an authentication method, an authentication system, and an authentication device used in an automated driving system.

BACKGROUND

In recent years, a task for driving an automobile has been passed over from a human driver to a driving system that adopts automated driving. The driving system adopting automated driving (hereinafter, referred to as an automated driving system) includes electronic control units (hereinafter, referred to as ECUs) that fully control, for example, steering, braking, and acceleration in accordance with values received from various sensors. This raises hopes that traffic accidents caused by human errors may be reduced and that environmental pollution caused by exhaust fumes and the like may be controlled.

An automated driving system is typically divided into three major sections. The three sections are: a recognition section that obtains information about traffic conditions from sensors or communications for measuring a surrounding environment; a determination section that determines an optimum traveling route and an optimum traveling speed in accordance with the information from the recognition section; and a control section that controls, for example, acceleration, braking, and steering in accordance with a result of the determination made by the determination section. To achieve a higher level of automated driving, research and development is continuously carried out on technological fields of the recognition and determination sections in particular. Thus, significant technological progress has been made. Vehicle development usually takes a multi-year period and thus cannot avoid a long-term plan. On this account, study has been made to implement the recognition and determination sections as a separate external device. In this case, a vehicle already including an automated driving system is connected to this external device that is separate from the vehicle but includes components that implement an even higher level of automated driving system. This can keep the automated driving system up to date.

However, although full automation of an automated driving system is under development, it is presumed that steering may be performed by a driver or ECUs depending on the case. Arguments are greatly made on determination of responsibility. For example, Non-Patent Literature (NPL) 1 classifies driving automation into six levels and defines responsibility for each level.

CITATION LIST

Non Patent Literature

NPL 1: SAE-33016_201806: Taxonomy and Definitions for Terms Related to Driving Automation Systems for On-Road Motor Vehicle

SUMMARY

Technical Problem

To adopt these driving automation levels, determining the current driving automation level of the vehicle is highly significant. Here, the aforementioned automated driving system is further enhanced because of the separate external device. More specifically, the driving automation level of the system may change depending on the external device used. On this account, the driving automation level of the system including the vehicle equipped with the external device is to be appropriately determined.

In response to the above issue, it is an object of the present disclosure to provide an authentication method and so forth capable of appropriately determining a system-wide driving automation level of an automated driving system including an external device attached to a vehicle.

Solution to Problem

In order to address the above problem, in accordance with an aspect of the present disclosure, an authentication method is used by an automated driving system that includes a vehicle and an external device, the external device communicating with the vehicle to cause the vehicle to implement automated driving, the vehicle holding a first certificate that certifies validity of the vehicle, the external device holding a second certificate that certifies validity of the external device, and the authentication method includes: validating a third certificate that certifies validity of a combination of the vehicle and the external device, in accordance with a result of device authentication performed between the vehicle and the external device by reference to the first certificate and the second certificate.

Advantageous Effects

According to the present disclosure, a system-wide driving automation level of an automated driving system including an external device attached to a vehicle can be appropriately determined. This results in a safer automated driving system.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 illustrates an example of a format of a certificate table according to Embodiment 1.

FIG. 17 illustrates an example of a format of a certificate table according to Embodiment 2.

FIG. 28 is a sequence diagram illustrating an example of an operation performed to invalidate the public key certificate according to Variation of Embodiment 3.

DESCRIPTION OF EMBODIMENTS

Figure 1:
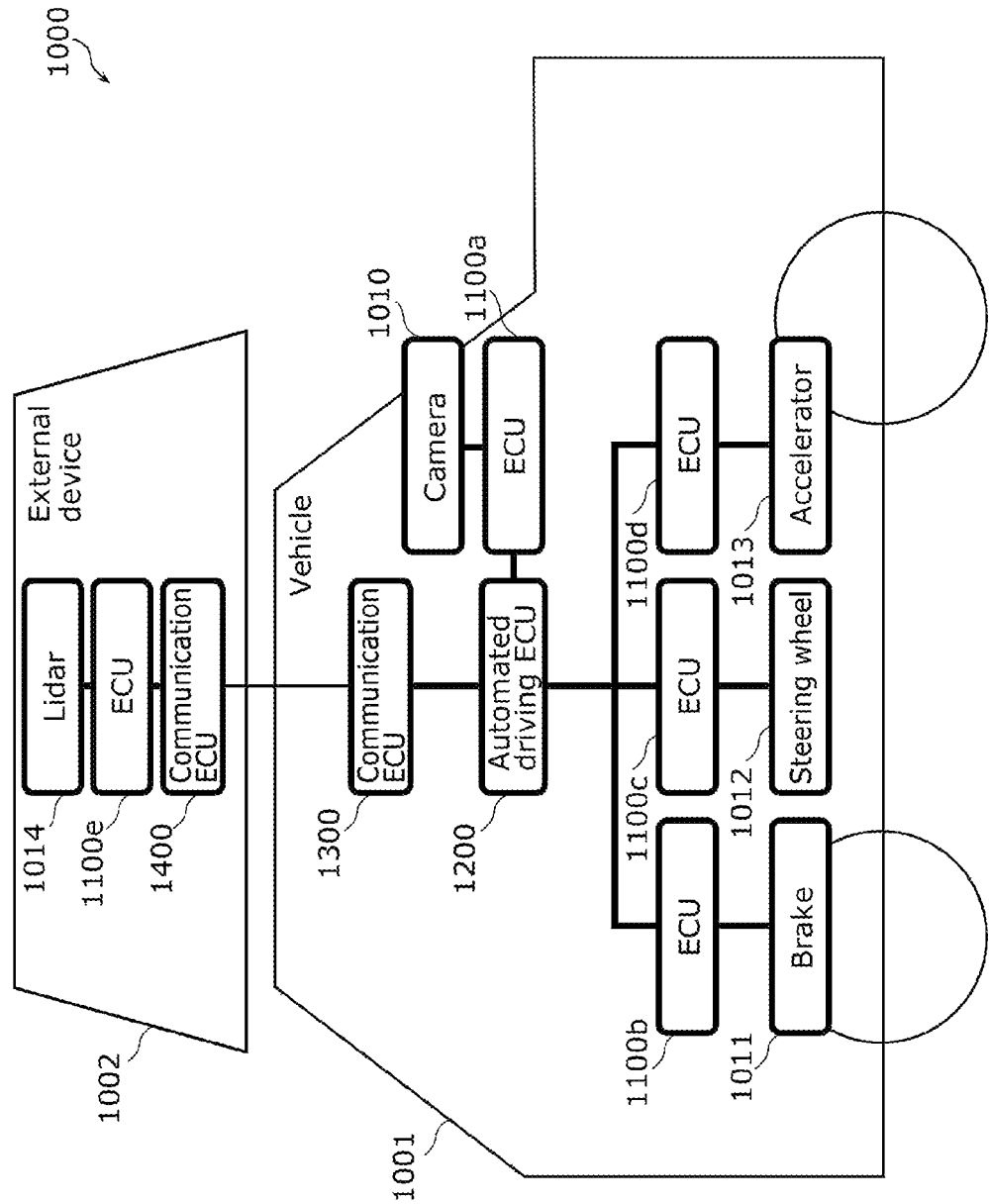
FIG. 1 illustrates an example of an overall configuration of an automated driving system according to Embodiment 1.

In order to address the above problem, in accordance with an aspect of the present disclosure, an authentication method is used by an automated driving system that includes a vehicle and an external device, the external device communicating with the vehicle to cause the vehicle to implement automated driving, the vehicle holding a first certificate that certifies validity of the vehicle, the external device holding a second certificate that certifies validity of the external device, and the authentication method includes: validating a third certificate that certifies validity of a combination of the vehicle and the external device, in accordance with a result of device authentication performed between the vehicle and the external device by reference to the first certificate and the second certificate.

When an external device is attached to a vehicle included in an automated driving system, device authentication is performed between the vehicle and the external device. If the device authentication is successful, the automated driving system can recognize a combination of the valid vehicle and the valid external device included in the automated driving system as a result of the device authentication. For example, the automated driving system stores a third certificate for each combination of a vehicle and an external device. Each third certificate indicates a system-wide driving automation level of the automated driving system corresponding to the combination. Thus, the automated driving system validates the third certificate corresponding to the combination recognized. Then, the automated driving system can recognize the driving automation level corresponding to the third certificate validated, or more specifically, the system-wide driving automation level of the automated driving system including the combination. As a result, the system-wide driving automation level of the automated driving system including the external device attached to the vehicle can be appropriately determined. This maintains the entire system in a safe state.

It is possible that the authentication method further includes: outputting information about a system-wide driving automation level of the automated driving system including the combination of the vehicle and the external device corresponding to the third certificate validated.

Thus, an occupant or manager of the vehicle can be notified about the system-wide driving automation level of the automated driving system. Moreover, automated driving corresponding to the system-wide driving automation level of the automated driving system can be achieved.

It is also possible that the validating includes validating the third certificate corresponding to at least one of a vehicle identification (ID) of the vehicle and a device ID of the external device, the vehicle ID and the device ID being obtained as the result of the device authentication.

As a result of obtaining the vehicle ID of the valid vehicle or the device ID of the valid external device, the third certificate corresponding to this vehicle ID or device ID is validated.

It is further possible that the third certificate is issued during manufacturing of the vehicle and thus previously held in the vehicle.

This case allows the certificate to be validated quickly without using an external communication device. Moreover, the third certificate can be previously issued corresponding to a specific combination of a specific vehicle and a specific external device. Then, validation of the third certificate can be restricted if a combination is different from this specific combination. This maintains the entire system in a safer state.

It is still further possible that the automated driving system further includes a server, and the third certificate is transmitted from the server to one of the vehicle and the external device when the device authentication is performed.

In this case, no storage area is used in, for example, the vehicle to store the certificate previously issued. Thus, the storage area can be saved. This case also allows easy addition of a third certificate corresponding to a new combination of a vehicle and an external device.

It is still further possible that the validating includes validating the third certificate if a traveling state of the vehicle satisfies a specific condition.

In this case, the third certificate is validated only if the traveling state of the vehicle satisfies the specific condition. For example, the third certificate is validated when the traveling state of the vehicle does not affect the driver. Thus, the validation can be achieved without reducing the convenience.

It is still further possible that the traveling state of the vehicle that satisfies the specific condition is a stopping state.

An external device is not usually attached to a vehicle that is currently moving. If the external device is attached to the vehicle that is currently moving, or more specifically, device authentication is performed while the vehicle is moving, some kind of anomaly may be occurring. On this account, the third certificate is validated only when the vehicle is in the stopping state. This prevents the third certificate from being validated while an anomaly is possibly occurring. This also prevents a malfunction that mistakenly causes validation of the third certificate while the vehicle is moving.

It is still further possible that the authentication method further includes: monitoring a state between the vehicle and the external device; and invalidating the third certificate depending on a change in the state.

In some cases, the system-wide driving automation level may be changed back to an individual driving automation level of the vehicle, depending on the state between the vehicle and the external device. For this reason, the third certificate is invalidated depending on the state between the vehicle and the external device, so that the driving automation level can be set appropriately.

It is still further possible that the state is a communication state between the vehicle and the external device, and the invalidating includes invalidating the third certificate if the communication state is anomalous.

In the event of the communication anomaly occurring between the vehicle and the external device, the automated driving system including the vehicle and the external device fails to function properly. Thus, the third certificate is invalidated depending on the communication state between the vehicle and the external device that affects the driving automation level. Then, the driving automation level can be set appropriately.

It is still further possible that the monitoring includes monitoring the state if a traveling state of the vehicle satisfies a specific condition.

Thus, if the traveling state of the vehicle changes, whether the third certificate is to be invalidated is determined. This ensures the safety of the driver.

It is still further possible that the traveling state of the vehicle that satisfies the specific condition is a stopping state.

Thus, the third certificate is invalidated only when the vehicle is in the stopping state. This can reduce processing load.

In accordance with another aspect of the disclosure, an authentication system is in an automated driving system that includes a vehicle and an external device, the external device communicating with the vehicle to cause the vehicle to implement automated driving, the vehicle holding a first certificate that certifies validity of the vehicle, the external device holding a second certificate that certifies validity of the external device, and the authentication system includes: a manager that validates a third certificate that certifies validity of a combination of the vehicle and the external device, in accordance with a result of device authentication performed between the vehicle and the external device by reference to the first certificate and the second certificate.

Thus, the authentication system capable of appropriately determining a system-wide driving automation level of the automated driving system including the external device attached to the vehicle can be provided.

In accordance with still another aspect of the disclosure, an authentication device is included in a vehicle of an automated driving system that includes the vehicle and an external device, the external device communicating with the vehicle to cause the vehicle to implement automated driving, and the authentication device includes: a holder that holds a first certificate that certifies validity of the vehicle; an authenticator that performs authentication of the external device by reference to a second certificate that certifies validity of the external device; and a manager that validates a third certificate that certifies validity of a combination of the vehicle and the external device, in accordance with a result of the authentication.

Thus, the authentication device capable of appropriately determining a system-wide driving automation level of the automated driving system including the external device attached to the vehicle can be provided. Moreover, an anomalous external device is prevented from being attached to the vehicle. This maintains the safe state without mistakenly increasing the driving automation level.

In accordance with still another aspect of the disclosure, an authentication device is included in an external device of an automated driving system that includes a vehicle and the external device, the external device communicating with the vehicle to cause the vehicle to implement automated driving, and the authentication device includes: a holder that holds a second certificate that certifies validity of the external device; an authenticator that performs authentication of the vehicle by reference to a first certificate that certifies validity of the vehicle; and a manager that validates a third certificate that certifies validity of a combination of the vehicle and the external device, in accordance with a result of the authentication.

Thus, the authentication device capable of appropriately determining a system-wide driving automation level of the automated driving system including the external device attached to the vehicle can be provided. Moreover, the external device is prevented from being attached to an anomalous vehicle. This maintains the safe state without mistakenly increasing the driving automation level.

Hereinafter, the authentication method etc. according to the aspects of the present disclosure will be described in detail with reference to the drawings. The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment 1

[1. System Configuration]

Hereinafter, automated driving system 1000 is described with reference to the drawings, according to an embodiment of the present disclosure.

[1.1 Overall Configuration of Automated Driving System 1000]

FIG. 1 illustrates an example of an overall configuration of automated driving system 1000 according to Embodiment 1.

Automated driving system 1000 includes vehicle 1001 and external device 1002 that is connected to vehicle 1001 for operation.

For example, vehicle 1001 includes: ECUs 1100a, 1100b, 1100c, and 1100d that are connected via a corresponding in-vehicle network; camera 1010, brake 1011, steering wheel 1012, and accelerator 1013, each of which is controlled by a corresponding one of the ECUs; automated driving ECU 1200 that communicates with ECUs 1100a to 1100d to perform control related to automated driving; and communication ECU 1300 that communicates with automated driving ECU 1200 via the in-vehicle network.

ECUs 1100a to 1100d implement vehicle control by exchanging communication messages with one another via the in-vehicle network. The in-vehicle network may be Ethernet (registered trademark) or a controller area network (CAN) (registered trademark), for example.

Automated driving ECU 1200 communicates with the other ECUs via the in-vehicle network to make a determination and issue a control instruction for automated driving.

Communication ECU 1300 communicates with external device 1002 and exchanges messages with external device 1002 and the other ECUs of vehicle 1001.

External device 1002 communicates with vehicle 1001 to provide at least one function for implementing automated traveling of vehicle 1001 (by issuing instructions for steering, acceleration, and deceleration, for instance). For example, external device 1002 includes ECU 1100e, Lidar 1014 that is controlled by ECU 1100e, and communication ECU 1400 that communicates with ECU 1100e via the in-vehicle network.

Similar to ECU 1100a for instance, ECU 1100e exchanges communication messages via an in-vehicle network. The in-vehicle network may be Ethernet, for example.

Communication ECU 1400 communicates with vehicle 1001 and exchanges messages with vehicle 1001 and the other ECU of external device 1002.

[1.2 Configuration Diagram of ECU 1100a]

Figure 2:
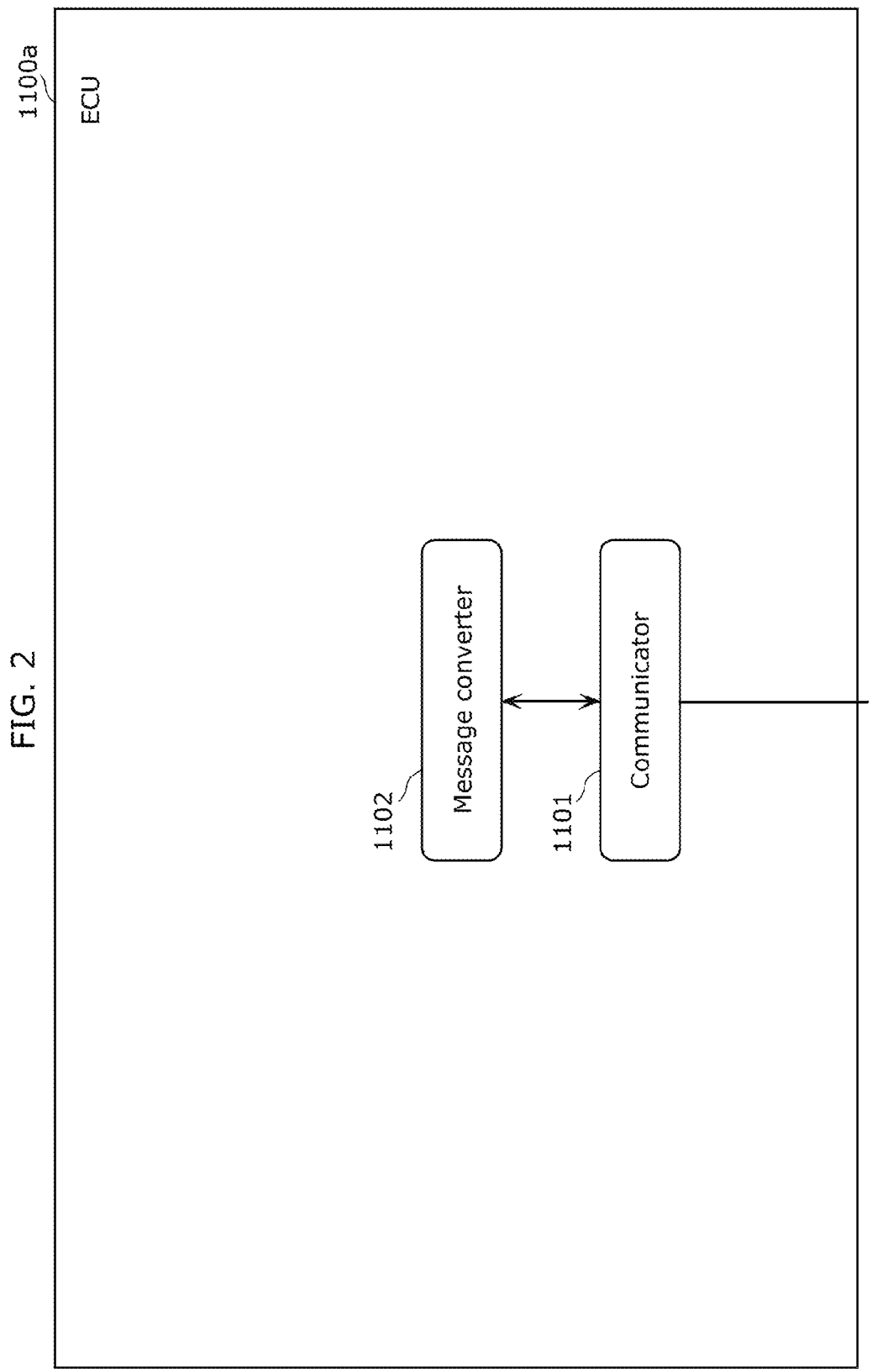
FIG. 2 illustrates an example of a configuration of an ECU according to Embodiment 1.

FIG. 2 illustrates an example of a configuration of ECU 1100a according to Embodiment 1.

For example, ECU 1100a includes communicator 1101 and message converter 1102. Each of ECU 1100b, ECU 1100c, ECU 1100d, and ECU 1100e has a configuration similar to the configuration of ECU 1100a. Thus, description on the configurations of these ECUs is omitted.

Communicator 1101 communicates with an external ECU or various sensors via the in-vehicle network. Communicator 1101 notifies message converter 1102 of a received message or a received sensor value. Moreover, communicator 1101 transmits a message notified by message converter 1102, to another ECU or a corresponding sensor.

Message converter 1102 converts the sensor value of the corresponding sensor notified by communicator 1101 according to a format of the in-vehicle network. Then, message converter 1102 transmits the converted value to the other ECU via communicator 1101. Moreover, message converter 1102 converts a communication message received from communicator 1101 into a sensor value or setting information, and then transmits this value or information to the corresponding sensor via communicator 1101.

[1.3 Configuration Diagram of Automated Driving ECU 1200]

Figure 3:
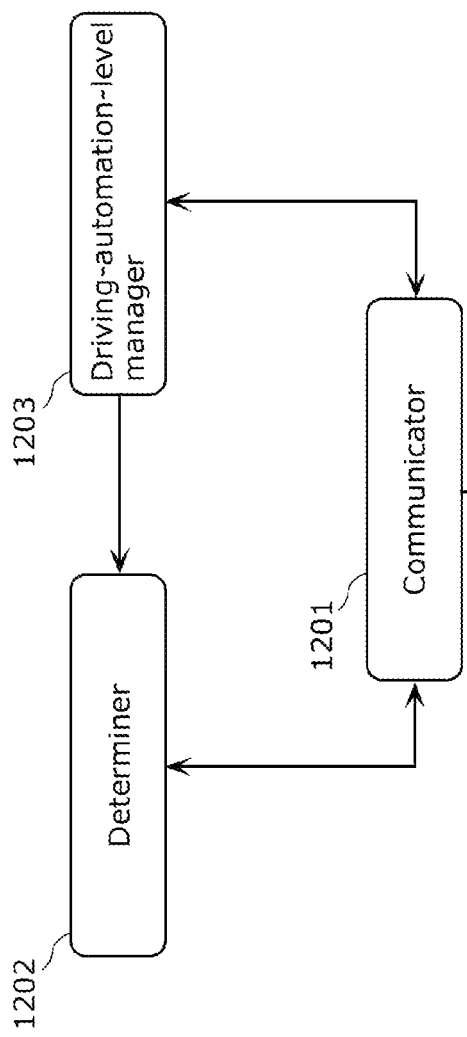
FIG. 3 illustrates an example of a configuration of an automated driving ECU according to Embodiment 1.

FIG. 3 illustrates an example of a configuration of automated driving ECU 1200 according to Embodiment 1.

For example, automated driving ECU 1200 includes communicator 1201, determiner 1202, and driving-automation-level manager 1203.

Communicator 1201 communicates with another ECU via the in-vehicle network, and notifies determiner 1202 and driving-automation-level manager 1203 of a received message. Moreover, communicator 1201 transmits a message notified by determiner 1202 to another ECU.

Determiner 1202 obtains a sensor value from the received message notified by communicator 1201. Then, determiner 1202 transmits an intended control instruction to another ECU via communicator 1201.

Driving-automation-level manager 1203 obtains information of a current certificate from the message notified by communicator 1201 and thereby manages a current driving automation level. Then, driving-automation-level manager 1203 notifies determiner 1202 of the driving automation level. Determiner 1202 is capable of operation corresponding to the current driving automation level. For example, the type of sensor used or an amount of data may be changed according to the current driving automation level.

[1.4 Configuration Diagram of Communication ECU 1300 of Vehicle 1001]

Figure 4:
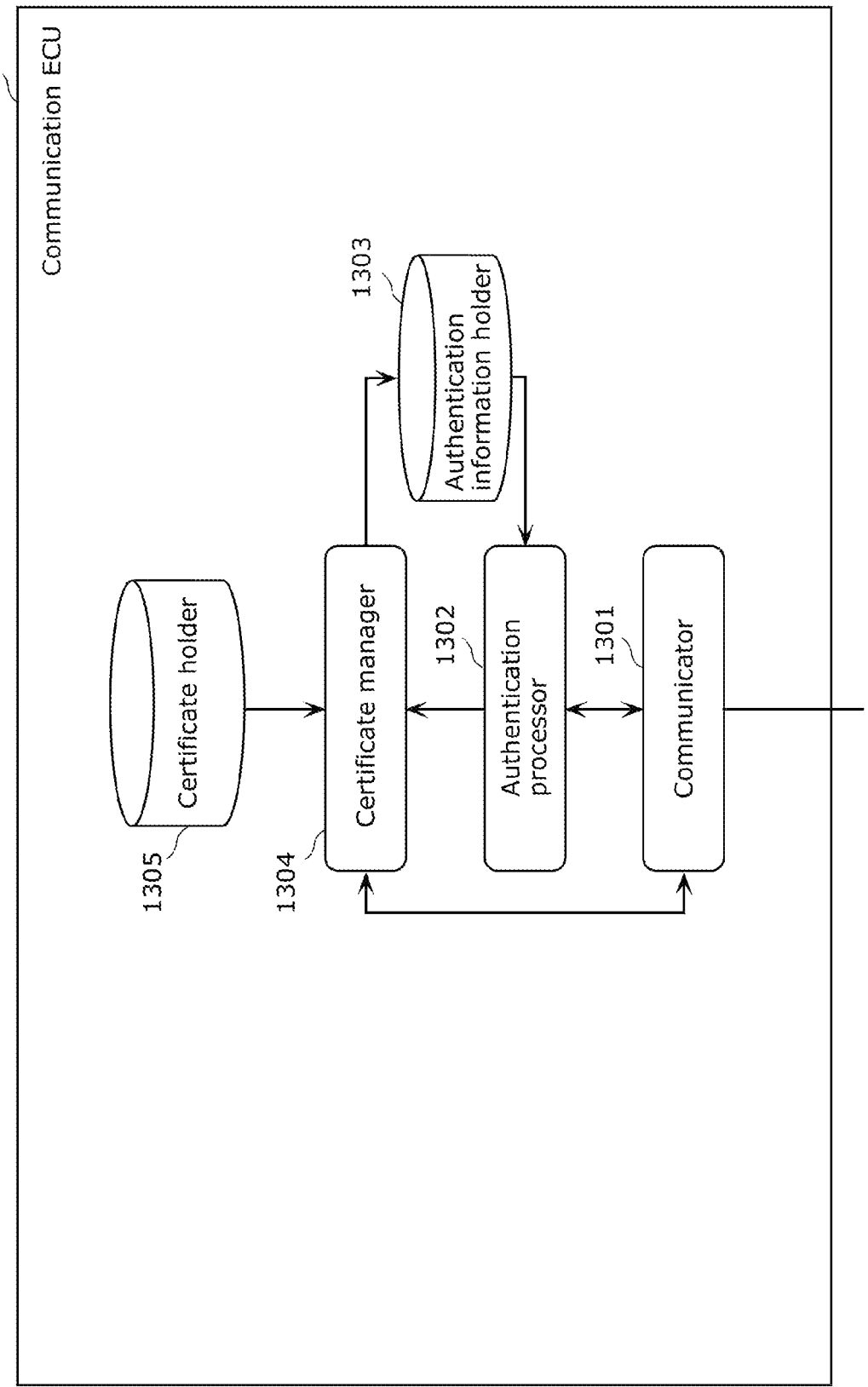
FIG. 4 illustrates an example of a configuration of a communication ECU of a vehicle according to Embodiment 1.

FIG. 4 illustrates an example of a configuration of communication ECU 1300 of vehicle 1001 according to Embodiment 1.

For example, communication ECU 1300 includes communicator 1301, authentication processor 1302, authentication information holder 1303, certificate manager 1304, and certificate holder 1305. Communication ECU 1300 is an example of an authentication device included in vehicle 1001 of automated driving system 1000.

Communicator 1301 communicates with external device 1002. For example, communicator 1301 performs wire communication with external device 1002. Moreover, communicator 1301 communicates with automated driving ECU 1200 of vehicle 1001 via the in-vehicle network. Communicator 1301 may also communicate with a server, for example. Communicator 1301 notifies authentication processor 1302 and certificate manager 1304 of a communication message received from external device 1002. Moreover, communicator 1301 receives notification from authentication processor 1302 and transmits a communication message to external device 1002. Although details are described later, communicator 1301 is an example of an output unit that outputs information about a system-wide driving automation level of automated driving system 1000 including a combination of vehicle 1001 and external device 1002 corresponding to a third certificate validated.

Authentication processor 1302 communicates with external device 1002 via communicator 1301 and performs authentication of external device 1002. Authentication processor 1302 is an example of an authenticator that authenticates external device 1002 using a second certificate that certifies validity of external device 1002. Authentication processor 1302 obtains information to be used for authentication, from authentication information holder 1303. Moreover, authentication processor 1302 notifies certificate manager 1304 of a result of the authentication.

Authentication information holder 1303 holds a key pair including a private key and a public key certificate. Authentication information holder 1303 is an example of a holder that holds a first certificate that certifies validity of vehicle 1001. The public key certificate held by authentication information holder 1303 is an example of the first certificate. The private key and the public key certificate are embedded into authentication information holder 1303 before shipment of vehicle 1001.

Figure 5:
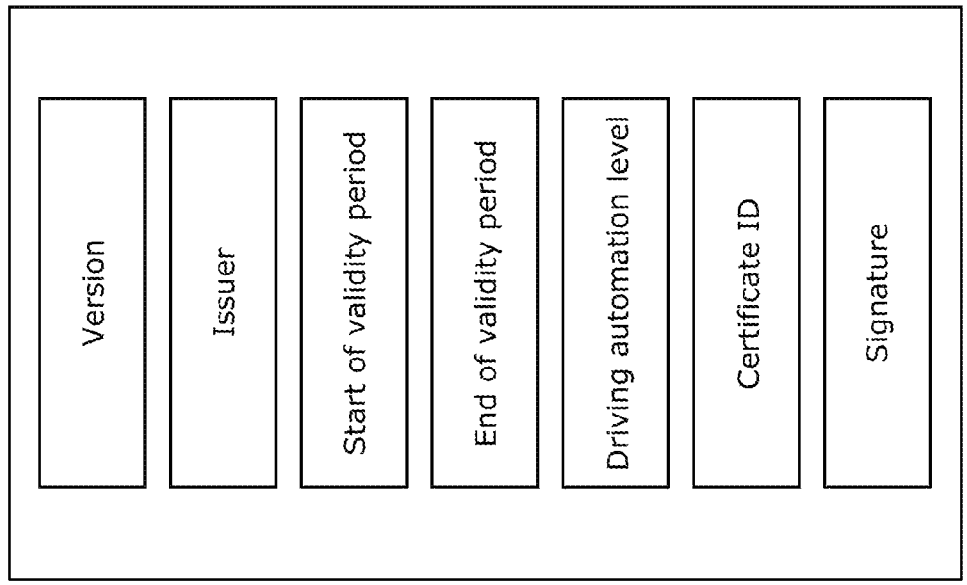
FIG. 5 illustrates an example of a format of a public key certificate.

FIG. 5 illustrates an example of a format of the public key certificate.

The public key certificate includes a version, an issuer, start and end of a validity period, a driving automation level, a certificate ID, and a signature of a certificate authority. Note that the public key certificate may not include the driving automation level.

Certificate holder 1305 holds a group of public key certificates and a certificate table. The public key certificate held by certificate holder 1305 is an example of the third certificate that certifies validity of the combination of vehicle 1001 and external device 1002. There are various kinds of vehicle 1001 and various kinds of external device 1002. Certificate holder 1305 holds the third certificate for each of various combinations of vehicle 1001 and external device 1002 (or more specifically, holds a group of third certificates). In Embodiment 1, the group of third certificates is issued during manufacturing of vehicle 1001 and previously held in vehicle 1001. For example, the group of third certificates is embedded into certificate holder 1305 before shipment of vehicle 1001. Each certificate included in the group of third certificates corresponds to a system-wide driving automation level of automated driving system 1000 including external device 1002 attached to vehicle 1001.

FIG. 6 illustrates an example of a format of the certificate table according to Embodiment 1. Each row in the certificate table corresponds to one third certificate. For example, each row in the certificate table includes a certificate ID of the third certificate, a driving automation level corresponding to the third certificate, a device ID corresponding to the third certificate, and a state of the third certificate. Note that the state of the third certificate is rewritten as either "Valid" or "Invalid" depending on a current state.

Certificate manager 1304 is an example of a manager that validates the third certificate in accordance with a result of the authentication performed by authentication processor 1302. In accordance with the result of the authentication notified by authentication processor 1302 and the certificate table held by certificate holder 1305, certificate manager 1304 notifies authentication information holder 1303 of the third certificate from the group of third certificates that corresponds to the result of the authentication. Then, certificate manager 1304 stores this third certificate into authentication information holder 1303. As a result, the third certificate notified is registered in authentication information holder 1303, so that this third certificate is validated. Furthermore, in accordance with a result of communication processing received from communicator 1301, certificate manager 1304 deletes the third certificate stored in authentication information holder 1303. As a result, the registration of the third certificate in authentication information holder 1303 is cancelled, so that the third certificate validated is invalidated. Validation and invalidation of the third certificate are described in detail later.

[1.5 Configuration Diagram of Communication ECU 1400 of External Device 1002]

Figure 7:
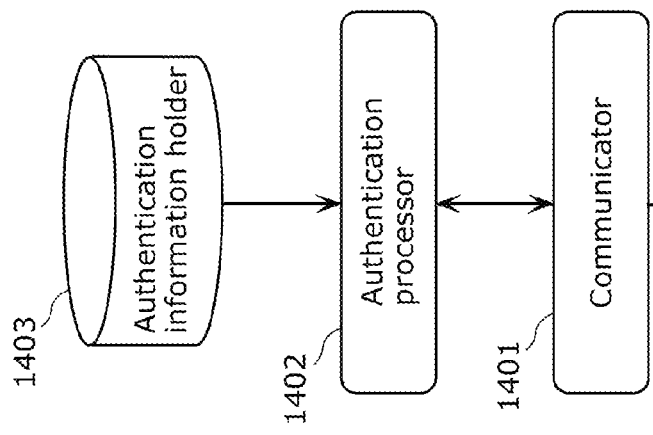
FIG. 7 illustrates an example of a configuration of a communication ECU of an external device according to Embodiment 1.

FIG. 7 illustrates an example of a configuration of communication ECU 1400 of external device 1002 according to Embodiment 1.

Communication ECU 1400 includes communicator 1401, authentication processor 1402, and authentication information holder 1403.

Communicator 1401 communicates with vehicle 1001. For example, communicator 1401 performs wire communication with vehicle 1001. Moreover, communicator 1401 communicates with ECU 1100e of external device 1002 via the in-vehicle network. Communicator 1401 notifies authentication processor 1402 of a communication message received from vehicle 1001. Moreover, communicator 1401 receives notification from authentication processor 1402 and transmits a communication message to vehicle 1001.

Authentication processor 1402 communicates with vehicle 1001 via communicator 1401 and performs authentication of vehicle 1001. Authentication processor 1402 is an example of an authenticator that authenticates vehicle 1001 using a first certificate that certifies validity of vehicle 1001. Authentication processor 1402 obtains information to be used for authentication, from authentication information holder 1403.

Authentication information holder 1403 holds a key pair including a private key and a public key certificate. Authentication information holder 1403 is an example of a holder that holds a second certificate that certifies validity of external device 1002. The public key certificate held by authentication information holder 1403 is an example of the second certificate. The private key and the public key certificate are embedded into authentication information holder 1403 before shipment of external device 1002. A format of the public key certificate (the second certificate) is similar to the format illustrated in FIG. 5, for example, and thus description on the format is omitted here.

[1.6 Example of Authentication Sequence]

Figure 8:
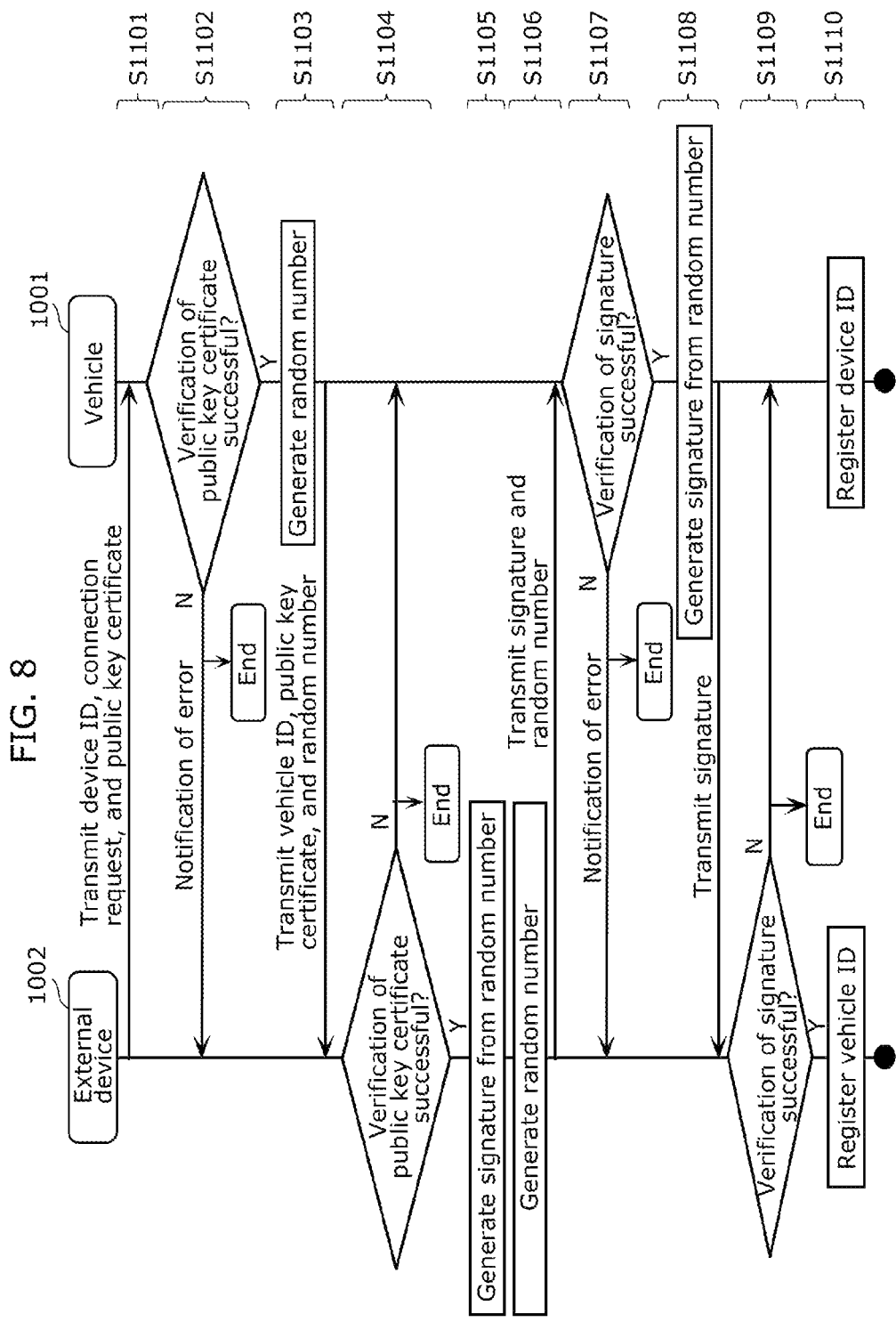
FIG. 8 is a sequence diagram illustrating an example of authentication performed between the vehicle and the external device according to Embodiment 1.

Next, the following describes mutual authentication performed between communication ECU 1300 of vehicle 1001 and communication ECU 1400 of external device 1002 when external device 1002 is attached to vehicle 1001, with reference to FIG. 8.

FIG. 8 is a sequence diagram illustrating an example of authentication performed between vehicle 1001 and external device 1002 according to Embodiment 1.

External device 1002 transmits a connection request to vehicle 1001 (S1101). In doing so, external device 1002 also transmits the device ID of external device 1002 and the public key certificate (that is, the second certificate).

Vehicle 1001 verifies the signature of the public key certificate received from external device 1002 (S1102). If the verification is unsuccessful (N in S1102), vehicle 1001 notifies external device 1002 of an error and then ends the processing.

If the verification is successful (Y in S1102), vehicle 1001 generates a random number. Then, vehicle 1001 transmits the generated random number together with the vehicle ID of vehicle 1001 and the public key certificate (that is, the first certificate) to external device 1002 (S1103).

Receiving the random number and the public key certificate, external device 1002 verifies the signature of the public key certificate received from vehicle 1001 (S1104). If the verification is unsuccessful (N in S1104), external device 1002 notifies vehicle 1001 of an error and then ends the processing.

If the verification is successful (Y in S1104), external device 1002 generates a signature from the random number received from vehicle 1001 and the private key of external device 1002 (S1105).

External device 1002 generates a random number. Then, external device 1002 transmits the generated random number together with the signature generated in S1105 (S1106).

Receiving the signature and the random number, vehicle 1001 verifies the signature using the public key certificate received in S1101 (S1107). If the verification of the signature is unsuccessful (N in S1107), vehicle 1001 notifies external device 1002 of an error and ends the processing.

If the verification of the signature is successful (Y in S1107), vehicle 1001 generates a signature from the random number received in S1107 and the private key of vehicle 1001. Then, vehicle 1001 transmits the generated signature to external device 1002 (S1108).

Receiving the signature, external device 1002 verifies the signature using the public key certificate received in S1104 (S1109). If the verification of the signature is unsuccessful (N in S1109), external device 1002 notifies vehicle 1001 of an error and ends the processing.

If the verification of the signature is successful in S1109, vehicle 1001 registers the device ID of external device 1002 as a connection destination while external device 1002 registers the vehicle ID of vehicle 1001 as a connection destination (S1110). In this way, as a result of the device authentication performed between vehicle 1001 and external device 1002, the vehicle ID of valid vehicle 1001 and the device ID of valid external device 1002 are obtained.

The device ID is an identifier that identifies external device 1002, and is not limited to any particular form. For example, the device ID may be a media access control (MAC) address or an identifier set independently by a manufacturer. The vehicle ID is an identifier that identifies vehicle 1001, and is not limited to any particular form. For example, the vehicle ID may be a MAC address or an identifier set independently by a manufacturer.

[1.7 Example of Flowchart to Validate Certificate]

Figure 9:
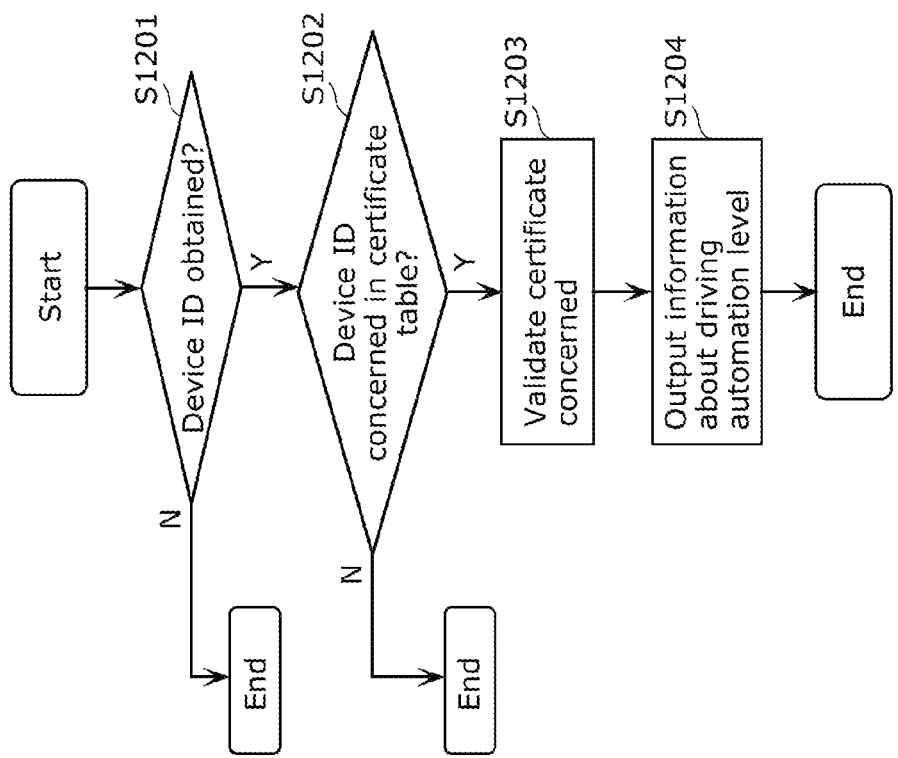
FIG. 9 is a flowchart illustrating an example of an operation performed to validate the public key certificate according to Embodiment 1.

Next, the following describes validation of the third certificate held in vehicle 1001 corresponding to a driving automation level and is, with reference to FIG. 9.

FIG. 9 is a flowchart illustrating an example of an operation performed to validate the public key certificate (the third certificate) according to Embodiment 1.

Certificate manager 1304 determines whether a device ID registered is obtainable (S1201). If no device ID is registered, certificate manager 1304 cannot obtain a device ID (N in S1201) and thus ends the processing with an error. In this example, in contrast, the authentication in FIG. 8 has been completed and the device ID has been registered.

If obtaining the device ID (Y in S1201), certificate manager 1304 checks whether the device ID obtained is in the certificate table (S1202). If the device ID obtained is not in the certificate table (N in S1202), certificate manager 1304 ends the processing with an error.

If the device ID obtained is in the certificate table (Y in S1202), certificate manager 1304 changes the state of the third certificate corresponding to the device ID obtained to "Valid" (S1203). To be more specific, certificate manager 1304 checks the device ID obtained against the certificate table and notifies authentication information holder 1403 of the third certificate having a certificate ID in the row corresponding to the device ID concerned. Then, certificate manager 1304 changes the state in the row corresponding to the device ID concerned to "Valid". For example, if external device 1002 having the device ID "XXX" is attached to vehicle 1001 and the device authentication is completed, certificate manager 1304 obtains the device ID "XXX" and checks the device ID "XXX" against the certificate table. Then, certificate manager 1304 notifies authentication information holder 1403 of the third certificate having the certificate ID "1" in the row corresponding to the device ID "XXX" as illustrated in FIG. 6. Moreover, certificate manager 1304 changes the state in the row corresponding to the device ID "XXX" to "Valid".

In this way, the third certificate corresponding to at least one of the vehicle ID of vehicle 1001 and the device ID of external device 1002 obtained as a result of the device authentication performed between vehicle 1001 and external device 1002 is validated. In this example, the third certificate of vehicle 1001 is validated. Here, because the vehicle ID of vehicle 1001 is fixed, the third certificate corresponding to the device ID of external device 1002 is validated.

Then, communicator 1301 outputs information about a system-wide driving automation level of automated driving system 1000 corresponding to the third certificate validated (S1204). The system-wide driving automation level of automated driving system 1000 refers to the driving automation level of automated driving system 1000 including the combination of vehicle 1001 and external device 1002. The information about the system-wide driving automation level of automated driving system 1000 may also be: information used for displaying the driving automation level on a display provided in, for example, vehicle 1001 or a monitoring room for monitoring vehicle 1001; or information used for displaying that manual driving is unnecessary. Moreover, the information about the system-wide driving automation level of automated driving system 1000 may also be information used for causing automated driving ECU 1200 to perform automated driving corresponding to the system-wide driving automation level of automated driving system 1000.

[1.8 Example of Flowchart to Invalidate Certificate]

Figure 10:
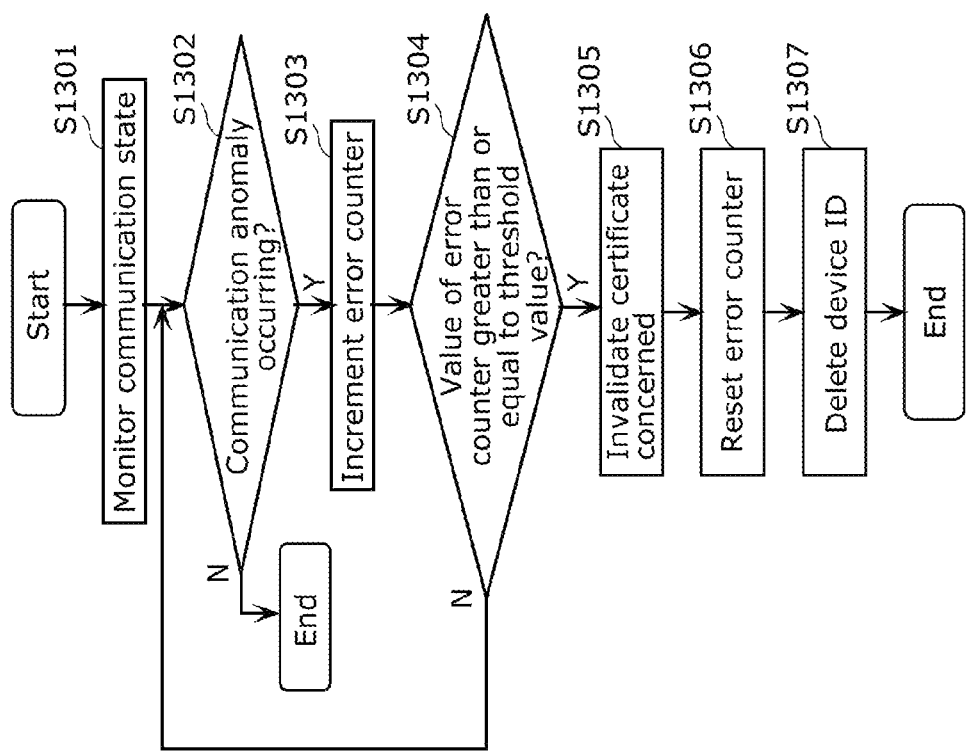
FIG. 10 is a flowchart illustrating an example of an operation perform to invalidate the public key certificate according to Embodiment 1.

Next, the following describes invalidation of the third certificate held in vehicle 1001 corresponding to a driving automation level, with reference to FIG. 10.

FIG. 10 is a flowchart illustrating an example of an operation perform to invalidate the public key certificate (the third certificate) according to Embodiment 1.

Certificate manager 1304 monitors a communication state between vehicle 1001 and external device 1002 via communicator 1301 (S1301).

Certificate manager 1304 determines whether the communication state between vehicle 1001 and external device 1002 is anomalous (S1302). If no communication anomaly is occurring (N in S1302), certificate manager 1304 ends the processing.

If a communication anomaly is occurring (Y in S1302), certificate manager 1304 increments an error counter (S1303).

Certificate manager 1304 determines whether a value of the error counter is greater than or equal to a threshold value (S1304). If the value of the error counter is smaller than the threshold value (N in S1304), certificate manager 1304 returns to S1302. The threshold value is not particularly intended to be limiting and may be set as appropriate.

If the value of the error counter is greater than or equal to the threshold value (Y in S1304), certificate manager 1304 invalidates the third certificate validated (S1305). To be more specific, if the communication anomaly between vehicle 1001 and external device 1002 has continued for at least a certain period of time, certificate manager 1304 invalidate the third certificate validated. For example, certificate manager 1304 invalidates the third certificate concerned by deleting the third certificate stored in authentication information holder 1303. In this case, certificate manager 1304 changes the state of the third certificate concerned to "Invalid" in the certificate table.

Certificate manager 1304 resets the error counter (S1306).

Certificate manager 1304 deletes the device ID of the connection destination (S1307).

In this way, certificate manager 1304 monitors the state between vehicle 1001 and external device 1002, and invalidates the third certificate depending on a change in this state. To be more specific, the state between vehicle 1001 and external device 1002 refers to a communication state between vehicle 1001 and external device 1002. If this communication state is anomalous, certificate manager 1304 invalidates the third certificate.

[1.9 Advantageous Effects According to Embodiment 1]

Automated driving system 1000 according to Embodiment 1 is previously installed with the third certificate different from the first certificate of vehicle 1001 and the second certificate of external device 1002. Then, the third certificate is validated or invalidated depending on a result of communication between vehicle 1001 and external device 1002. Thus, an appropriate driving automation level can be determined for an operation performed by vehicle 1001 and external device 1002 cooperatively. Hence, the safety is ensured.

Variation of Embodiment 1

Automated driving system 1000 according to Embodiment 1 is capable of validating or invalidating the third certificate any time. However, timing of validation or invalidation may be controlled depending on a traveling state. This case is described as Variation of Embodiment 1. Note that points similar to those described in Embodiment 1 are omitted from description.

[1.10 Example of Flowchart to Validate Certificate]

Figure 11:
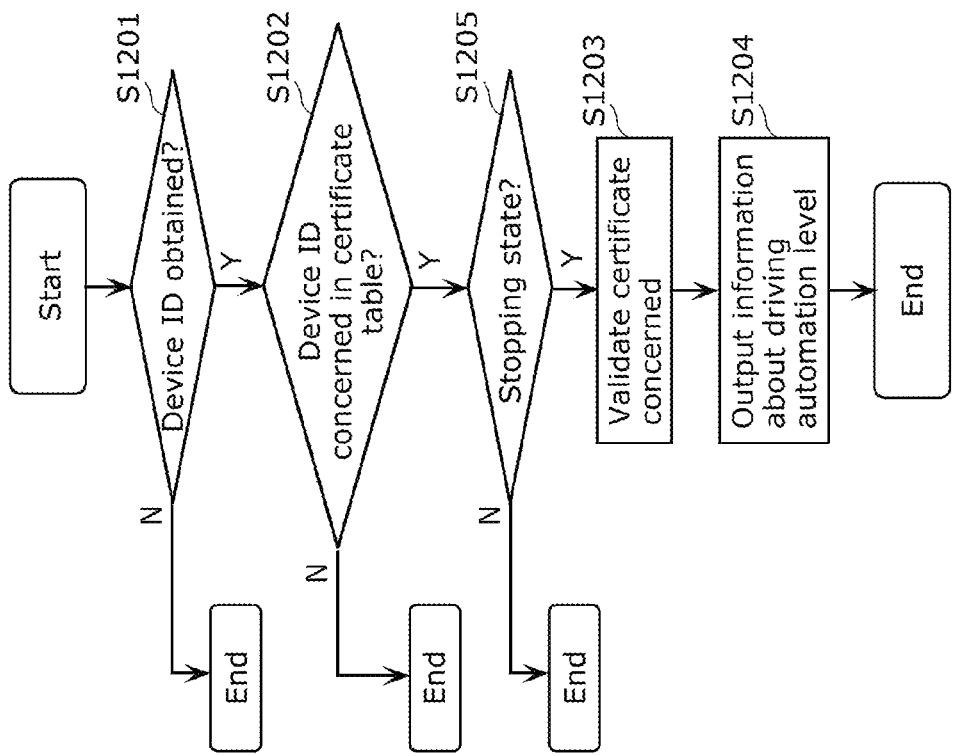
FIG. 11 is a flowchart illustrating an example of an operation performed to validate a public key certificate according to Variation of Embodiment 1.

FIG. 11 is a flowchart illustrating an example of an operation performed to validate a public key certificate (a third certificate) according to Variation of Embodiment 1. The third certificate is validated if the traveling state of vehicle 1001 satisfies a specific condition, according to Variation of Embodiment 1. Note that steps similar to those in Embodiment 1 are assigned the same step numbers as in Embodiment 1 and description on these steps is omitted here.

For example, the traveling state of vehicle 1001 that satisfies the specific condition is a stopping state. Before validating the third certificate, certificate manager 1304 determines whether vehicle 1001 is in the stopping state (S1205). If vehicle 1001 is not in the stopping state (N in S1205), certificate manager 1304 interrupts to end this validation performed for the third certificate. If vehicle 1001 is in the stopping state (Y in S1205), certificate manager 1304 validates the third certificate (S1203).

[1.11 Example of Flowchart to Invalidate Certificate]

Figure 12:
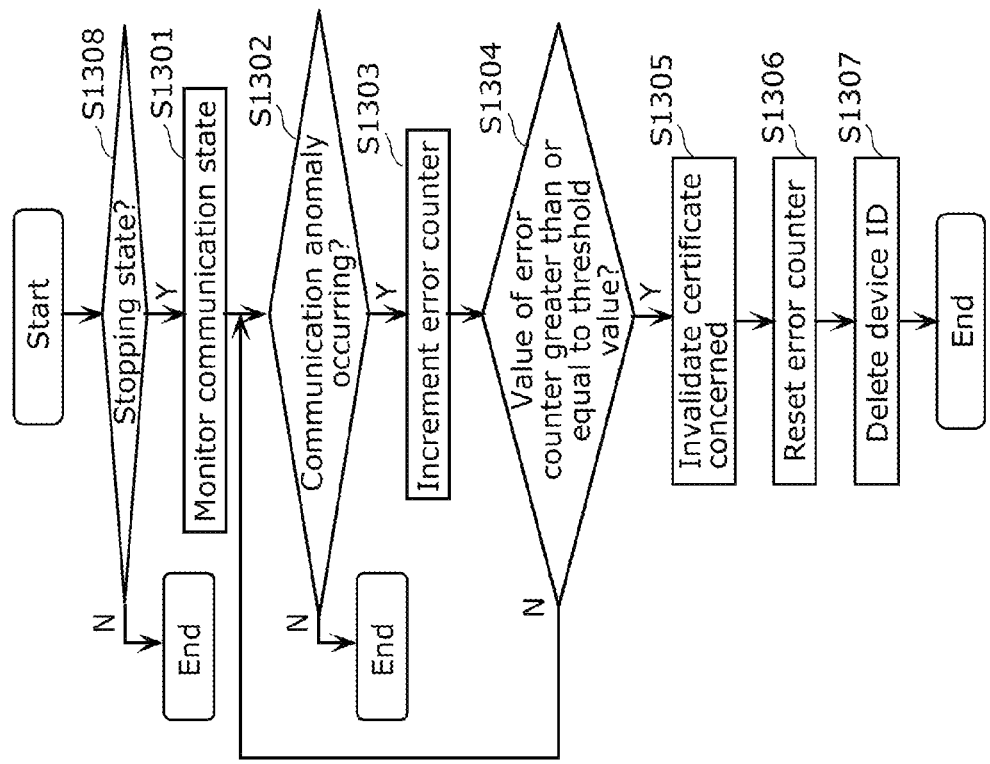
FIG. 12 is a flowchart illustrating an example of an operation performed to invalidate the public key certificate according to Variation of Embodiment 1.

FIG. 12 is a flowchart illustrating an example of an operation performed to invalidate the public key certificate (the third certificate) according to Variation of Embodiment 1. The state between vehicle 1001 and external device 1002 (for example, a communication state between vehicle 1001 and external device 1002) is monitored if the traveling state of vehicle 1001 satisfies the specific condition, according to Variation of Embodiment 1. Then, the third certificate is invalidated depending on the communication state. Note that steps similar to those in Embodiment 1 are assigned the same step numbers as in Embodiment 1 and description on these steps is omitted here.

Certificate manager 1304 determines whether vehicle 1001 is in the stopping state (S1308). If vehicle 1001 is not in the stopping state (N in S1308), certificate manager 1304 interrupts to end this invalidation performed for the third certificate. If vehicle 1001 is in the stopping state (Y in S1308), certificate manager 1304 monitors the communication state (S1301) and continues the invalidation.

[1.12 Advantageous Effects of Variation of Embodiment 1]

Automated driving system 1000 according to Variation of Embodiment 1 is previously installed with the third certificate different from the first certificate of vehicle 1001 and the second certificate of external device 1002. Then, the third certificate is validated or invalidated depending on the traveling state of vehicle 1001 in addition to a result of communication between vehicle 1001 and external device 1002. Thus, an appropriate driving automation level can be determined for an operation performed by vehicle 1001 and external device 1002 cooperatively. Hence, the safety is ensured.

Note that external device 1002 may have a function of communication ECU 1300 of vehicle 1001. More specifically, external device 1002 may be installed with the group of third certificates, and validate or invalidate the third certificate. In this case, the third certificate is validated by external device 1002. Here, because the device ID of external device 1002 is fixed, the third certificate corresponding to the vehicle ID of vehicle 1001 is validated. The same advantageous effects can also be achieved in this case.

Embodiment 2

[2. System Configuration]

Hereinafter, automated driving system 2000 is described with reference to the drawings, according to Embodiment 2 of the present disclosure.

[2.1 Overall Configuration of Automated Driving System 2000]

Figure 13:
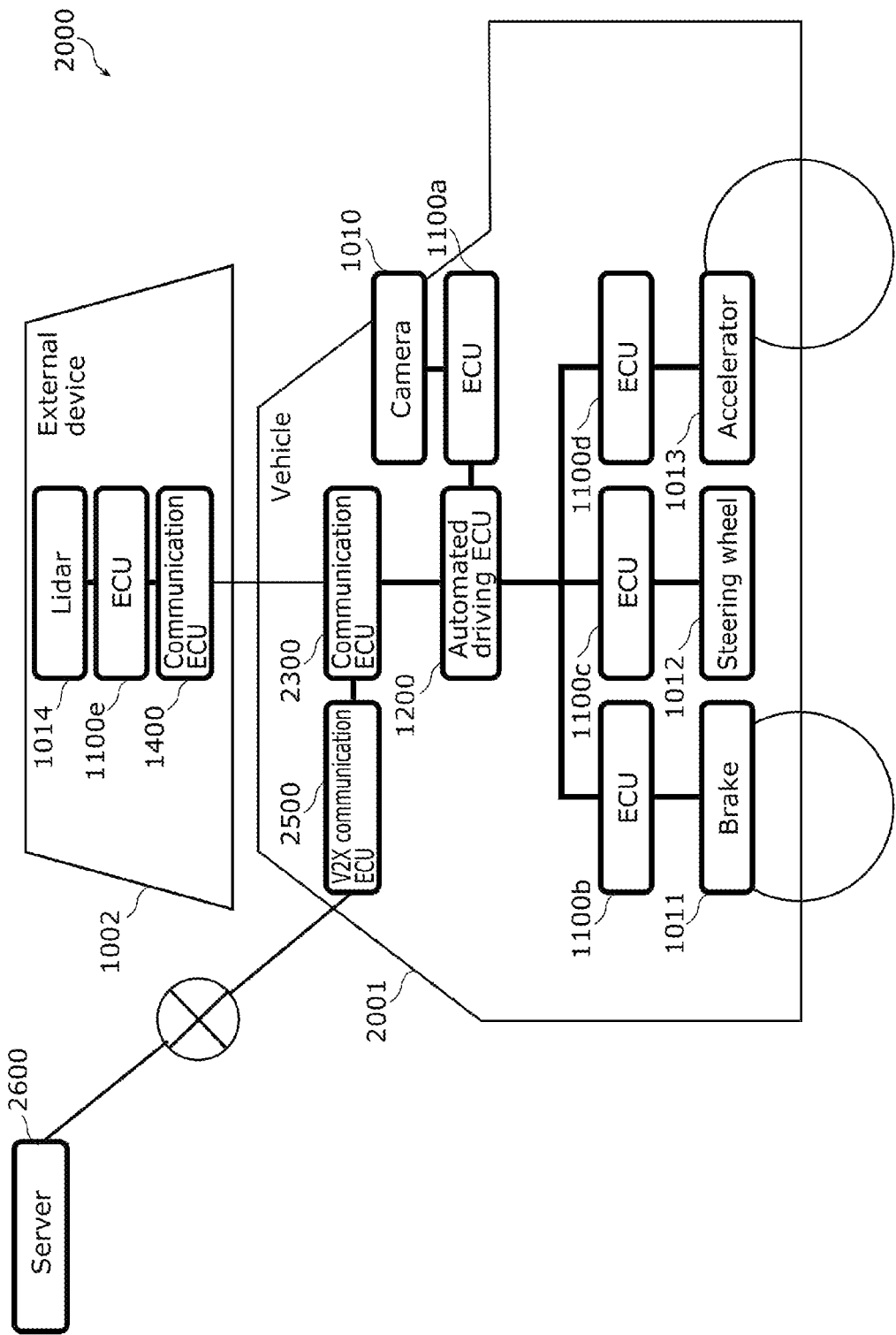
FIG. 13 illustrates an example of an overall configuration of an automated driving system according to Embodiment 2.

FIG. 13 illustrates an example of an overall configuration of automated driving system 2000 according to Embodiment 2.

Automated driving system 2000 includes: vehicle 2001; external device 1002 that is connected to vehicle 2001 for operation; and server 2600 that performs V2X communication with vehicle 2001.

The same structural components as those in Embodiment 1 are assigned the same numerals as in Embodiment 1, and description on these same structural components is omitted here.

For example, vehicle 2001 includes: ECUs 1100a, 1100b, 1100c, and 1100d that are connected via a corresponding in-vehicle network; camera 1010, brake 1011, steering wheel 1012, and accelerator 1013, each of which is controlled by a corresponding one of the ECUs; automated driving ECU 1200 that communicates with ECUs 1100a to 1100d to perform control related to automated driving; communication ECU 2300 that communicates with automated driving ECU 1200 and V2X communication ECU 2500 via the in-vehicle network; and V2X communication ECU 2500 that performs V2X communication with server 2600.

Communication ECU 2300 communicates with external device 1002 and exchanges messages with external device 1002 and the other ECUs of vehicle 2001. Moreover, communication ECU 2300 communicates with server 2600 via V2X communication ECU 2500 and exchanges messages to be used for validation of a public key certificate (a third certificate) corresponding to a new driving automation level when external device 1002 is attached to vehicle 2001.

V2X communication ECU 2500 communicates with server 2600 to enable exchange of messages between server 2600 and communication ECU 2300 of vehicle 2001.

Server 2600 communicates with vehicle 2001. Then, depending on a result of authentication performed between vehicle 2002 and external device 1002, server 2600 issues the public key certificate (the third certificate) corresponding to the new driving automation level applied when external device 1002 is attached to vehicle 2001.

[2.2 Configuration Diagram of Communication ECU 2300 of Vehicle 2001]

Figure 14:
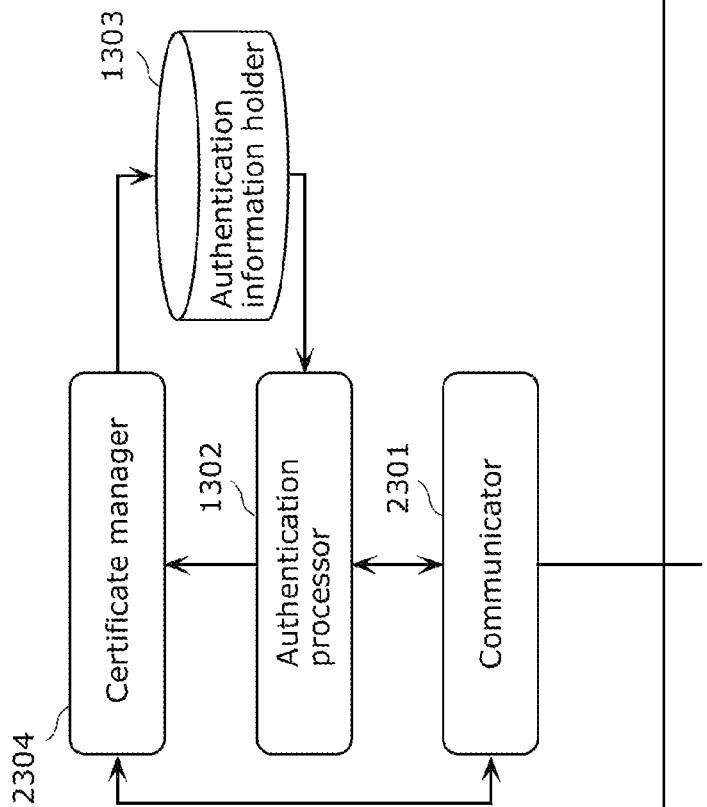
FIG. 14 illustrates an example of a configuration of a communication ECU of a vehicle according to Embodiment 2.

FIG. 14 illustrates an example of a configuration of communication ECU 2300 of vehicle 2001 according to Embodiment 2.

For example, communication ECU 2300 includes communicator 2301, authentication processor 1302, authentication information holder 1303, and certificate manager 2304. Communication ECU 2300 is an example of an authentication device included in vehicle 2001 of automated driving system 2000. The same structural components as those in Embodiment 1 are assigned the same numerals as in Embodiment 1, and are omitted from the following description.

Communicator 2301 communicates with external device 1002. For example, communicator 2301 performs wire communication with external device 1002. Moreover, communicator 2301 communicates with automated driving ECU 1200 and V2X communication ECU 2500 of vehicle 2001 via the in-vehicle network. Communicator 2301 notifies authentication processor 1302 and certificate manager 2304 of communication messages received from external device 1002 and server 2600. Moreover, communicator 2301 receives notification from authentication processor 1302 and certificate manager 2304 and transmits communication messages to external device 1002 and server 2600.

Certificate manager 2304 is an example of a manager that validates the third certificate in accordance with a result of the authentication performed by authentication processor 1302. In accordance with the result of the authentication notified by authentication processor 1302, certificate manager 2304 obtains the public key certificate (the third certificate), issued by server 2600, corresponding to a new driving automation level from server 2600 via communicator 2301. Then, certificate manager 2304 stores this third certificate into authentication information holder 1303. As a result, the third certificate is registered in authentication information holder 1303, so that this third certificate is validated in vehicle 2001. Furthermore, in accordance with a result of communication processing received from communicator 2301, certificate manager 2304 deletes the third certificate stored in authentication information holder 1303. As a result, the registration of the third certificate in authentication information holder 1303 is cancelled, so that the third certificate validated in vehicle 2002 is invalidated.

[2.3 Configuration Diagram of V2X Communication ECU 2500]

Figure 15:
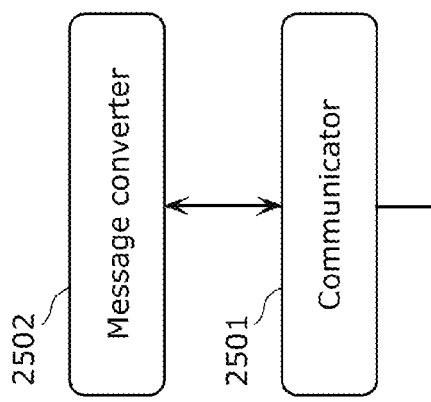
FIG. 15 illustrates an example of a configuration of a V2X communication ECU according to Embodiment 2.

FIG. 15 illustrates an example of a configuration of V2X communication ECU 2500 according to Embodiment 2. V2X communication ECU 2500 includes communicator 2501 and message converter 2502.

Communicator 2501 communicates with communication ECU 2300 via the in-vehicle network. Moreover, communicator 2501 communicates with server 2600 by radio via V2X communication. Communicator 2501 notifies message converter 2502 of a message received. Furthermore, communicator 2501 transmits a message notified by message converter 2502 to communication ECU 2300 or server 2600.

Message converter 2502 converts a message received from server 2600 via communicator 2501, according to a format of the in-vehicle network. Then, message converter 2502 transmits this converted message to communication ECU 2300 via communicator 2501. Moreover, message converter 2502 transmits a communication message received from communication ECU 2300 via communicator 2501, to server 2600 via communicator 2501.

[2.4 Configuration Diagram of Server 2600]

Figure 16:
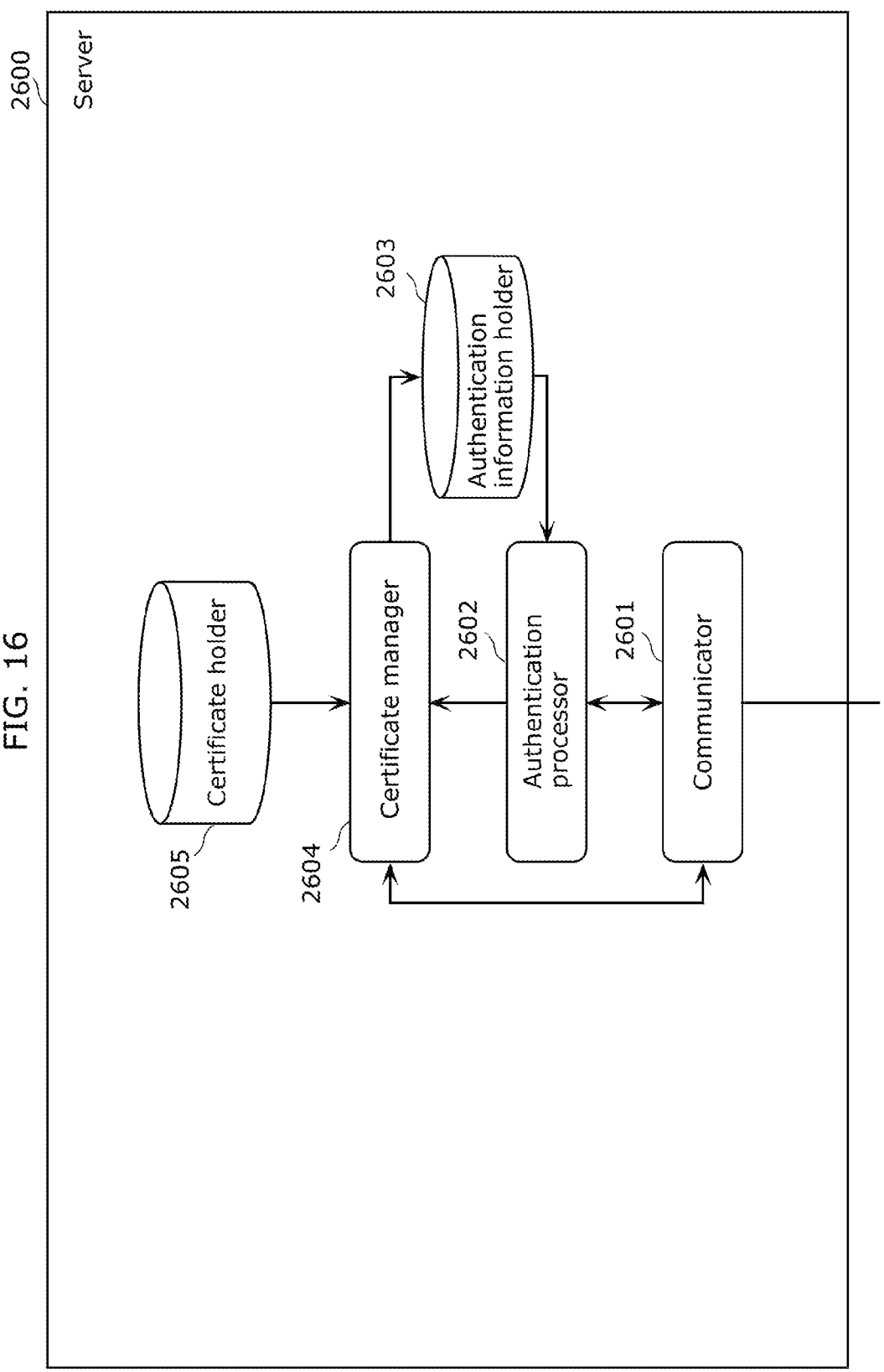
FIG. 16 illustrates an example of a configuration of a server according to Embodiment 2.

FIG. 16 illustrates an example of a configuration of server 2600 according to Embodiment 2.

Server 2600 includes communicator 2601, authentication processor 2602, authentication information holder 2603, certificate manager 2604, and certificate holder 2605. Server 2600 is an example of an authentication system included in automated driving system 2000.

Communicator 2601 performs V2X communication with vehicle 2001. Moreover, communicator 2601 notifies authentication processor 2602 and certificate manager 2604 of public key certificates (a first certificate and a second certificate) received from vehicle 2001. Communicator 2601 receives notification from authentication processor 2602 and certificate manager 2604, and transmits a communication message to vehicle 2001. Communicator 2601 is an example of an output unit that outputs information about a system-wide driving automation level of automated driving system 2000 including a combination of vehicle 2001 and external device 1002 corresponding to a third certificate validated.

Authentication processor 2602 communicates with vehicle 2001 via communicator 2601 and performs signature verification on the public key certificates (the first certificate and the second certificate) received from vehicle 2001. Moreover, authentication processor 2602 obtains information to be used for the signature verification from authentication information holder 2603. Moreover, authentication processor 2602 notifies certificate manager 2604 of a result of the signature verification.

Authentication information holder 2603 holds a key pair including a private key of a certificate authority and a public key certificate. An example of a structure of the public key certificate is similar to the structure illustrated in FIG. 5, and thus description on this structure is omitted here.

Certificate holder 2605 holds a certificate table.

FIG. 17 illustrates an example of a format of the certificate table according to Embodiment 2. Each row in the certificate table corresponds to one third certificate. For example, each row in the certificate table includes a certificate ID of the third certificate, a driving automation level corresponding to the third certificate, a combination of a vehicle ID and a driving ID corresponding to the third certificate, and a state of the third certificate. Note that the state of the third certificate is rewritten as either "Valid" or "Invalid" depending on a current state.

Certificate manager 2604 is an example of a manager that validates the third certificate in accordance with a result of device authentication performed between vehicle 2001 and external device 1002 using the first certificate and the second certificate. In accordance with the result of the authentication notified by authentication processor 2602 and the certificate table held by certificate holder 2605, certificate manager 2604 newly issues a third certificate that certifies validity of the combination of vehicle 2001 and external device 1002. Then, certificate manager 2604 notifies vehicle 2001 of this third certificate via communicator 2601 and stores this third certificate into authentication information holder 2603. As a result, the third certificate notified is registered in authentication information holder 2603, so that this third certificate is validated in server 2600. Furthermore, in response to an invalidation instruction from communicator 2301, certificate manager 2604 deletes the third certificate stored in authentication information holder 2603. As a result, the registration of the third certificate in authentication information holder 2603 is cancelled, so that the third certificate validated in server 2600 is invalidated.

[2.5 Example of Sequence to Issue Certificate]

Figure 18:
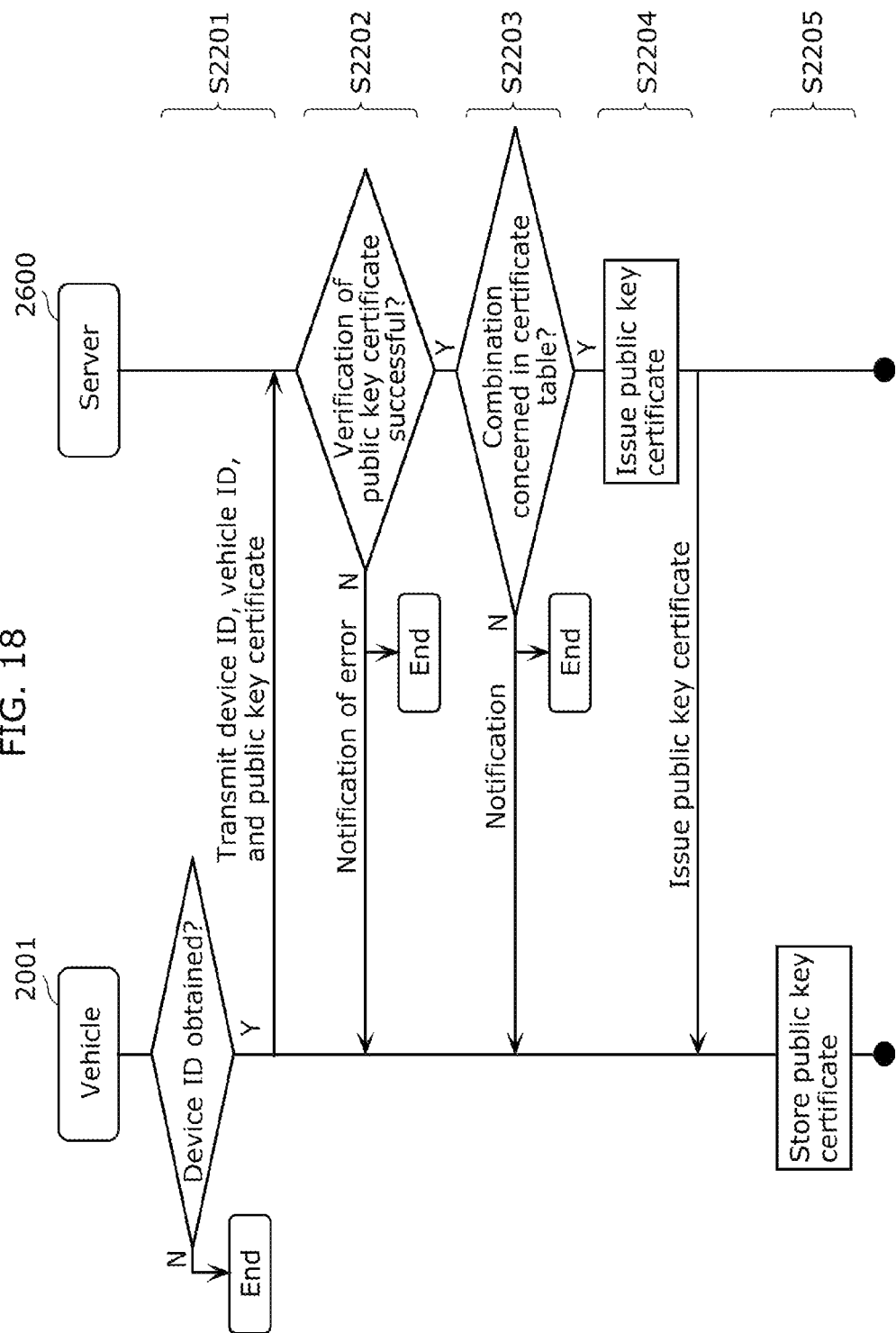
FIG. 18 is a sequence diagram illustrating an example of an operation performed to issue a public key certificate according to Embodiment 2.

Next, the following describes issuance of the third certificate by server 2600 corresponding to the driving automation level after mutual authentication performed between vehicle 2001 and external device 1002, with reference to FIG. 18. The third certificate issued by server 2600 is held and validated in vehicle 2001.

FIG. 18 is a sequence diagram illustrating an example of an operation performed to issue a public key certificate (a third certificate) according to Embodiment 2.

Vehicle 2001 determines whether a device ID registered is obtainable (S2201). If no device ID is registered, vehicle 2001 cannot obtain a device ID (N in S2201). Because the authentication is not completed, the processing is ended. In this example, in contrast, the authentication in FIG. 8 has been completed and the device ID has been registered.

If obtaining the device ID of external device 1002 (Y in S2201), vehicle 2001 transmits the device ID obtained, together with vehicle ID of vehicle 2001, the public key certificate (the first certificate) of vehicle 2001, and the public key certificate (the second certificate) of external device 1002, to server 2600.

Receiving the device ID of external device 1002, the vehicle ID of vehicle 2001, and the public key certificates of two kinds, server 2600 verifies the signatures of these two kinds of public key certificates received (S2202). If the verification is unsuccessful (N in S2202), server 2600 notifies vehicle 2001 of an error and then ends the processing.

If the verification is successful (Y in S2202), server 2600 verifies whether a combination of the device ID and the vehicle ID received in S2202 is in the certificate table (S2203). If the received combination of the device ID and the vehicle ID is not in the certificate table (N in S2203), server 2600 notifies vehicle 2001 about this and ends the processing with an error.

If the received combination of the device ID and the vehicle ID is in the certificate table (Y in S2203), server 2600 issues a third certificate corresponding to the obtained combination and then transmits this third certificate to vehicle 2001 (S2204). To be more specific, certificate manager 2604 of server 2600 checks the obtained combination of the device ID and the vehicle ID against the certificate table and notifies authentication information holder 2603 of the third certificate having a certificate ID in the row corresponding to the combination concerned. Then, certificate manager 2604 changes the state in the row corresponding to the combination concerned to "Valid". For example, if external device 1002 having the device ID "XXX" is attached to vehicle 1001 having the vehicle ID "AAA" and the device authentication is completed, certificate manager 2604 obtains the device ID "XXX" and the vehicle ID "AAA". Certificate manager 2604 also checks the combination of the device ID "XXX" and the vehicle ID "AAA" against the certificate table. Then, certificate manager 2604 notifies authentication information holder 2603 of the third certificate having the certificate ID "1" in the row corresponding to the device ID "XXX" and the vehicle ID "AAA" as illustrated in FIG. 17. Moreover, certificate manager 2604 changes the state in the row corresponding to the device ID "XXX" and the vehicle ID "AAA" to "Valid". In this way, the third certificate corresponding to the vehicle ID of vehicle 2001 and the device ID of external device 1002 obtained as a result of the device authentication performed between vehicle 2001 and external device 1002 is validated. Then, the third certificate validated in server 2600 is transmitted to vehicle 2001.

Vehicle 2001 stores the third certificate issued by server 2600 (S2205). For example, the third certificate is stored in authentication information holder 1303 of communication ECU 2300 in vehicle 2001. As a result, this third certificate is also validated in vehicle 2001.

Although not illustrated, server 2600 outputs information about a system-wide driving automation level of automated driving system 2000 including the combination of vehicle 2001 and external device 1002 corresponding to the third certificate validated. Here, vehicle 2001 (or more specifically, communicator 2301) may output the information about the system-wide driving automation level of automated driving system 2000 including the combination of vehicle 2001 and external device 1002 corresponding to the third certificate validated.

[2.6 Example of Sequence to Invalidate Certificate]

Figure 19:
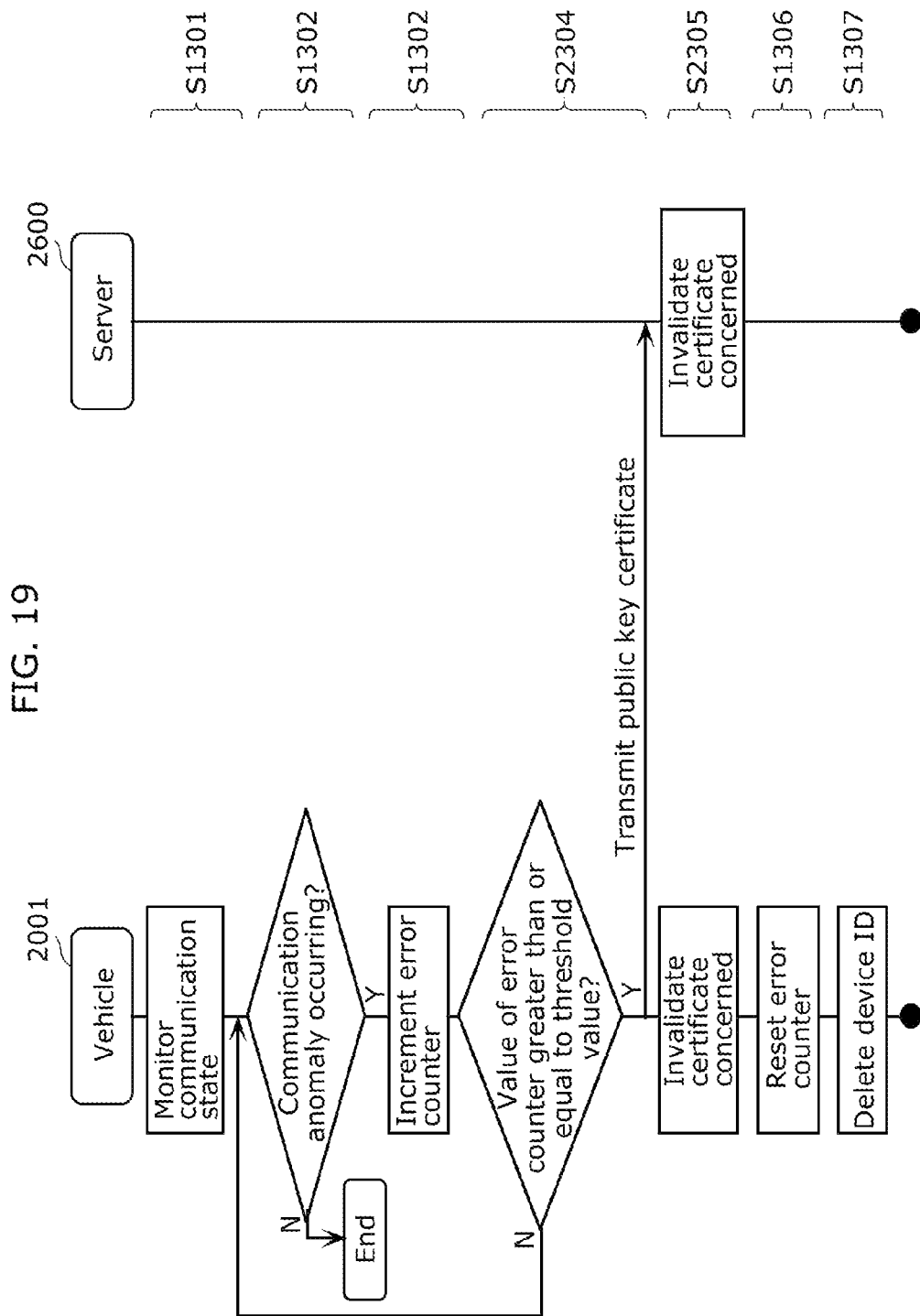
FIG. 19 is a sequence diagram illustrating an example of an operation performed to invalidate the public key certificate according to Embodiment 2.

Next, the following describes invalidation of the third certificate held in vehicle 2001 and server 2600 corresponding to the driving automation level, with reference to FIG. 19. Note that steps similar to those in Embodiment 1 are assigned the same step numbers as in Embodiment 1 and description on these steps is omitted here.

FIG. 19 is a sequence diagram illustrating an example of an operation performed to invalidate the public key certificate (the third certificate) according to Embodiment 2.

Vehicle 2001 determines whether a value of an error counter is greater than or equal to a threshold value (S2304). If the value of the error counter is greater than or equal to the threshold value (Y in S2304), vehicle 2001 notifies server 2600 of the issued public key certificate (the third certificate) and thereby instructs server 2600 to invalidate this third certificate. If the value of the error counter does not exceed the threshold value (N in S2304), vehicle 2001 returns to S1302.

If the value of the error counter is greater than or equal to the threshold value (Y in S2304), vehicle 2001 and server 2600 invalidate the respective third certificates stored (S2305). For example, certificate manager 2304 of communication ECU 2300 in vehicle 2001 invalidates the third certificate concerned by deleting the third certificate stored in authentication information holder 1303. Moreover, certificate manager 2604 of server 2600 invalidates the third certificate concerned by deleting the third certificate stored in authentication information holder 2603. In this case, certificate manager 2604 changes the state of the third certificate concerned to "Invalid" in the certificate table.

As described thus far, automated driving system 2000 according to Embodiment 2 includes server 2600. For device authentication, the third certificate is transmitted from server 2600 to vehicle 2001.

[2.7 Advantageous Effects According to Embodiment 2]

Automated driving system 2000 according to Embodiment 2 includes server 2600 that issues the third certificate different from the first certificate of vehicle 2001 and the second certificate of external device 1002. The third certificate issued is managed in vehicle 2001. Then, the third certificate is validated or invalidated depending on a result of communication between vehicle 2001 and external device 1002. Thus, an appropriate driving automation level can be determined for an operation performed by vehicle 1001 and external device 1002 cooperatively. Hence, the safety is ensured.

Variation of Embodiment 1

Automated driving system 2000 according to Embodiment 2 is capable of validating or invalidating the third certificate any time. However, timing of validation or invalidation may be controlled depending on a traveling state of vehicle 2001. This case is described as Variation of Embodiment 2. Note that points similar to those described in Embodiment 2 are omitted from description.

[2.8 Example of Sequence to Issue Certificate]

Figure 20:
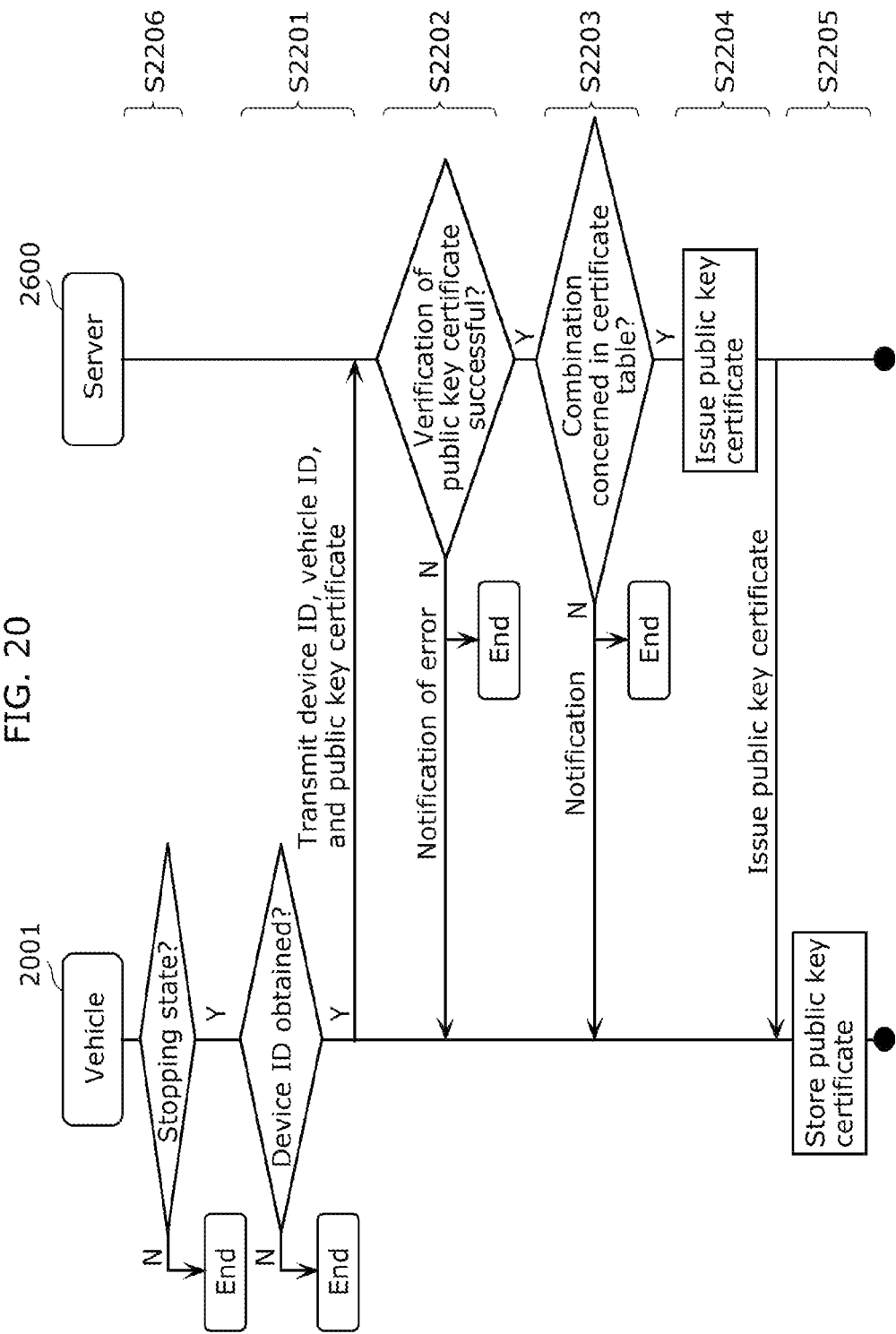
FIG. 20 is a sequence diagram illustrating an example of an operation performed to issue a public key certificate according to Variation of Embodiment 2.

FIG. 20 is a sequence diagram illustrating an example of an operation performed to issue a public key certificate (a third certificate) according to Variation of Embodiment 2. The third certificate is issued if the traveling state of vehicle 2001 satisfies a specific condition, according to Variation of Embodiment 2. Note that steps similar to those in Embodiment 2 are assigned the same step numbers as in Embodiment 2, and description on these steps is omitted here.

For example, the traveling state of vehicle 2001 that satisfies the specific condition is a stopping state. Before starting processing to validate the third certificate, vehicle 2001 determines whether vehicle 2001 is in the stopping state (S2206). If vehicle 2001 is not in the stopping state (N in S2206), vehicle 2001 ends the processing without starting the validation of the third certificate. If vehicle 2001 is in the stopping state (Y in S2206), vehicle 2001 starts the validation of the third certificate.

[2.9 Example of Sequence to Invalidate Certificate]

Figure 21:
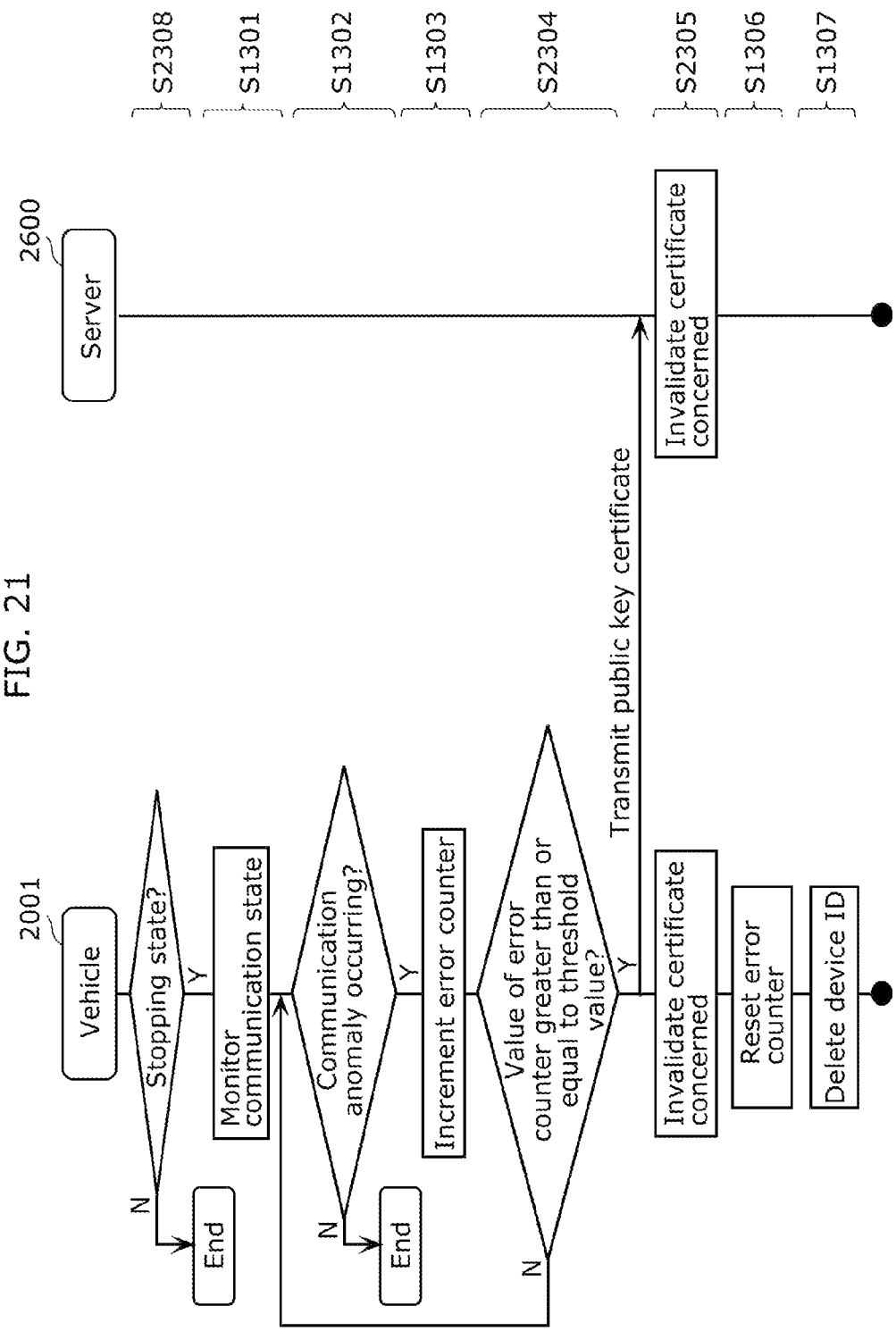
FIG. 21 is a sequence diagram illustrating an example of an operation performed to invalidate the public key certificate according to Variation of Embodiment 2.

FIG. 21 is a sequence diagram illustrating an example of an operation performed to invalidate the public key certificate (the third certificate) according to Variation of Embodiment 2. The state (such as a communication state) between vehicle 2001 and external device 1002 is monitored if the traveling state of vehicle 2001 satisfies the specific condition, according to Variation of Embodiment 1. Then, the third certificate is invalidated depending on the communication state. Note that steps similar to those in Embodiments 1 and 2 are assigned the same step numbers as in Embodiments 1 and 2, and description on these steps is omitted here.

Vehicle 2001 determines whether vehicle 2001 is in the stopping state (S2308). If vehicle 2001 is not in the stopping state (N in S2308), vehicle 2001 interrupts to end this invalidation performed for the third certificate. If vehicle 2001 is in the stopping state (Y in S2308), vehicle 2001 monitors the communication state (S1301) and continues the invalidation.

[2.10 Advantageous Effects of Variation of Embodiment 2]

Automated driving system 2000 according to Embodiment 2 includes server 2600 that issues the third certificate different from the first certificate of vehicle 2001 and the second certificate of external device 1002. The third certificate issued is managed in vehicle 2001. Then, the third certificate is validated or invalidated depending on the traveling state of vehicle 2001 in addition to a result of communication between vehicle 2001 and external device 1002. Thus, an appropriate driving automation level can be determined for an operation performed by vehicle 2001 and external device 1002 cooperatively. Hence, the safety is ensured.

Embodiment 3

[3. System Configuration]

Hereinafter, automated driving system 3000 is described with reference to the drawings, according to Embodiment 3 of the present disclosure.

[3.1 Overall Configuration of Automated Driving System 3000]

Figure 22:
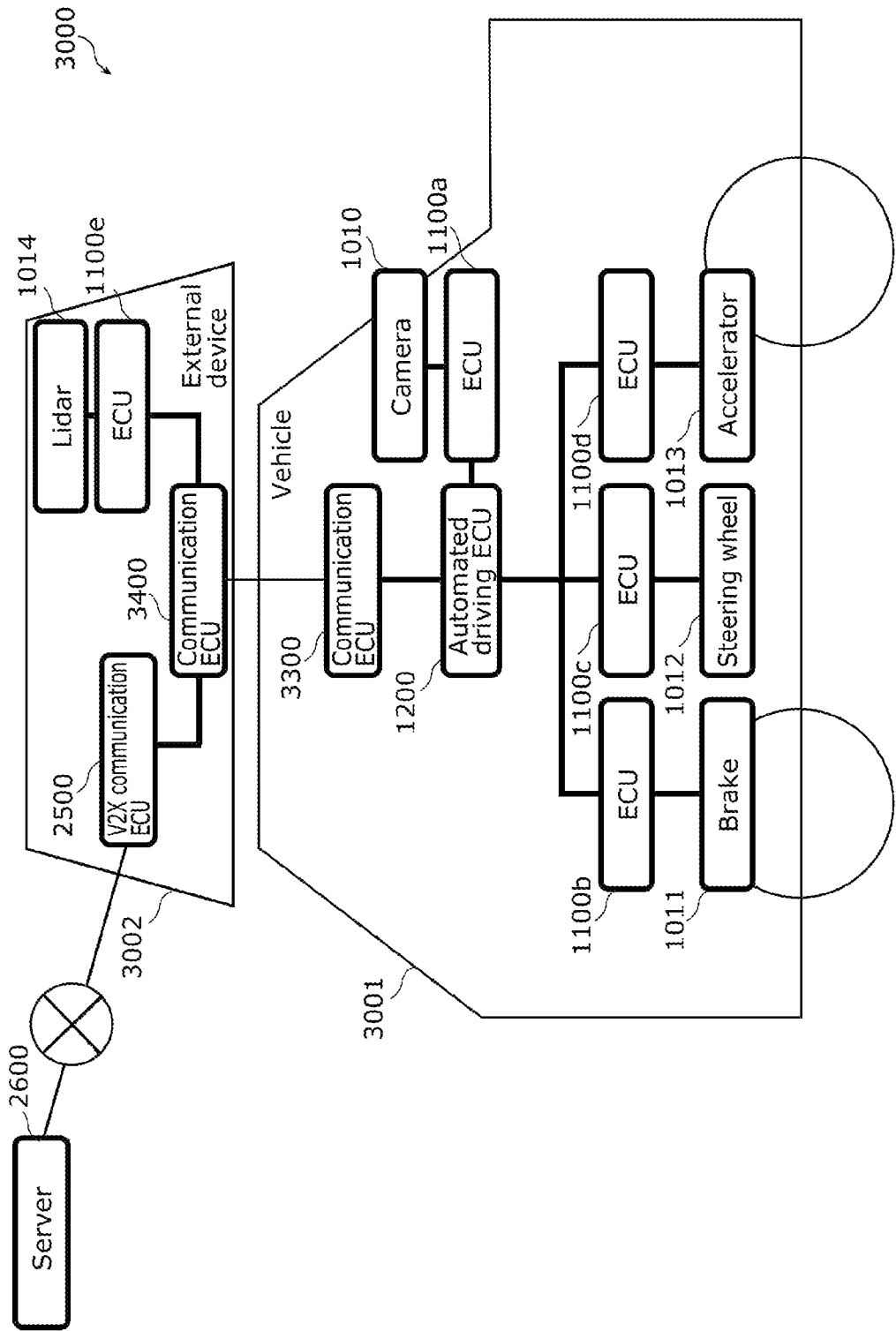
FIG. 22 illustrates an example of an overall configuration of an automated driving system according to Embodiment 3.

FIG. 22 illustrates an example of an overall configuration of automated driving system 3000 according to Embodiment 3.

Automated driving system 3000 includes: vehicle 3001; external device 3002 that is connected to vehicle 3001 for operation; and server 2600 that performs V2X communication with external device 3002.

The same structural components as those in Embodiments 1 and 2 are assigned the same numerals as in Embodiments 1 and 2, and description on these same structural components is omitted here.

For example, vehicle 3001 includes: ECUs 1100a, 1100b, 1100c, and 1100d that are connected via a corresponding in-vehicle network; camera 1010, brake 1011, steering wheel 1012, and accelerator 1013, each of which is controlled by a corresponding one of the ECUs; automated driving ECU 1200 that communicates with ECUs 1100a to 1100d to perform control related to automated driving; and communication ECU 3300 that communicates with automated driving ECU 1200 via the in-vehicle network.

Communication ECU 3300 communicates with external device 3002 and exchanges messages with external device 3002 and the other ECUs of vehicle 3001.

For example, external device 3002 includes ECU 1100e, Lidar 1014 that is controlled by ECU 1100e, communication ECU 3400 that communicates with ECU 1100e and V2X communication ECU 2500 via the in-vehicle network, and V2X communication ECU 2500 that performs V2X communication with server 2600.

Communication ECU 3400 communicates with vehicle 3001 and exchanges messages with vehicle 3001 and the other ECUs of external device 3002. Moreover, communication ECU 3400 communicates with server 2600 via V2X communication ECU 2500 and exchanges messages to be used for validation of a public key certificate (a third certificate) corresponding to a new driving automation level when external device 3002 is attached to vehicle 3001.

[3.2 Configuration Diagram of Communication ECU 3300 of Vehicle 3001]

Figure 23:
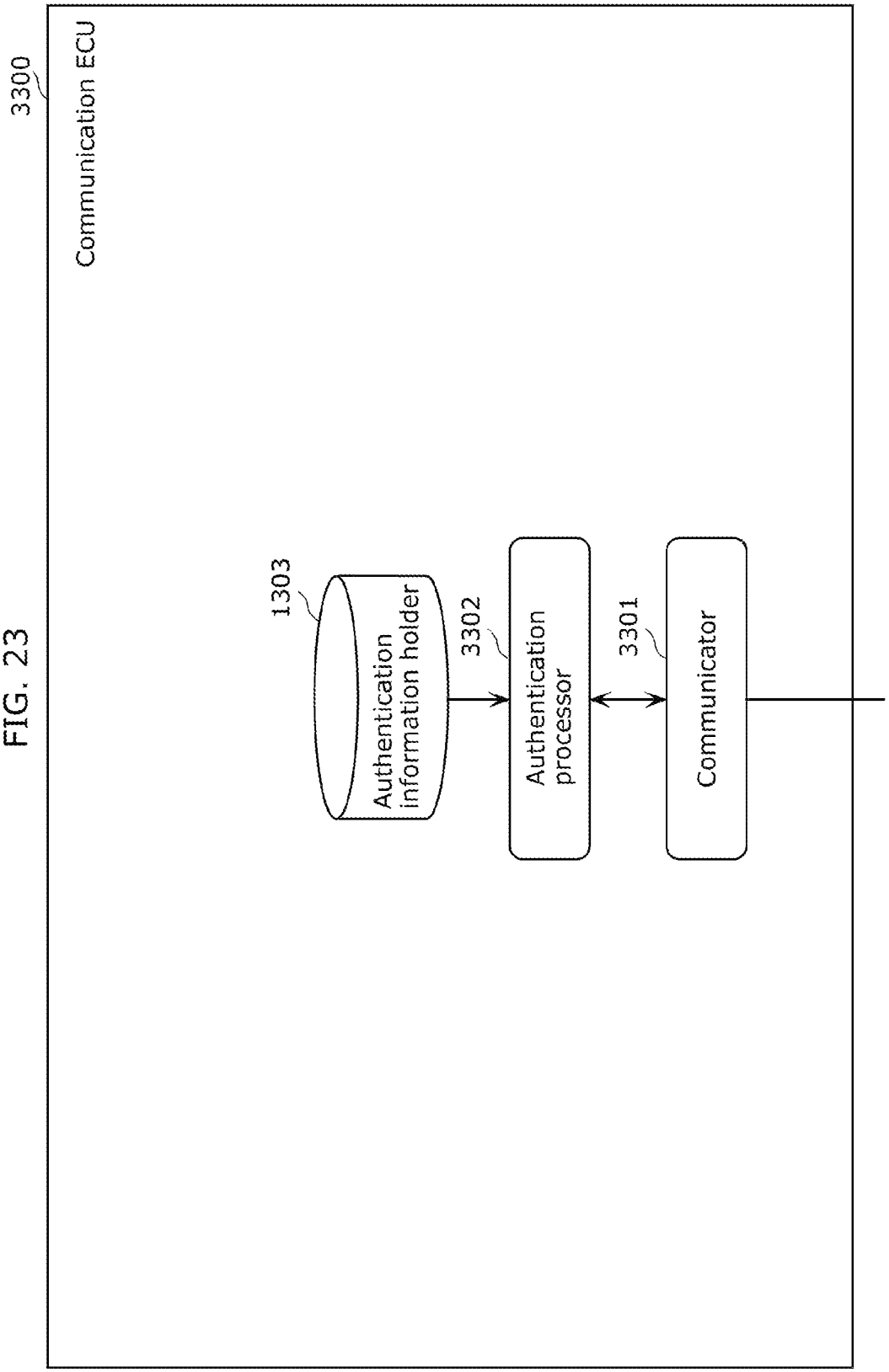
FIG. 23 illustrates an example of a configuration of a communication ECU of a vehicle according to Embodiment 3.

FIG. 23 illustrates an example of a configuration of communication ECU 3300 of vehicle 3001 according to Embodiment 3.

For example, communication ECU 3300 includes communicator 3301, authentication processor 3302, and authentication information holder 1303. The same structural components as those in Embodiment 1 are assigned the same numerals as in Embodiment 1, and are omitted from the following description.

Communicator 3301 communicates with external device 3002. For example, communicator 3301 performs wire communication with external device 3002. Moreover, communicator 3301 communicates with automated driving ECU 1200 of vehicle 3001 via the in-vehicle network. Communicator 3301 notifies authentication processor 3302 of a communication message received from external device 3002. Moreover, communicator 3301 receives notification from authentication processor 3302 and transmits a communication message to external device 3002.

Authentication processor 3302 communicates with external device 3002 via communicator 3301 and performs authentication of external device 3002. Authentication processor 3302 obtains information to be used for the authentication, from authentication information holder 1303.

[3.3 Configuration Diagram of Communication ECU 3400 of External Device 3002]

Figure 24:
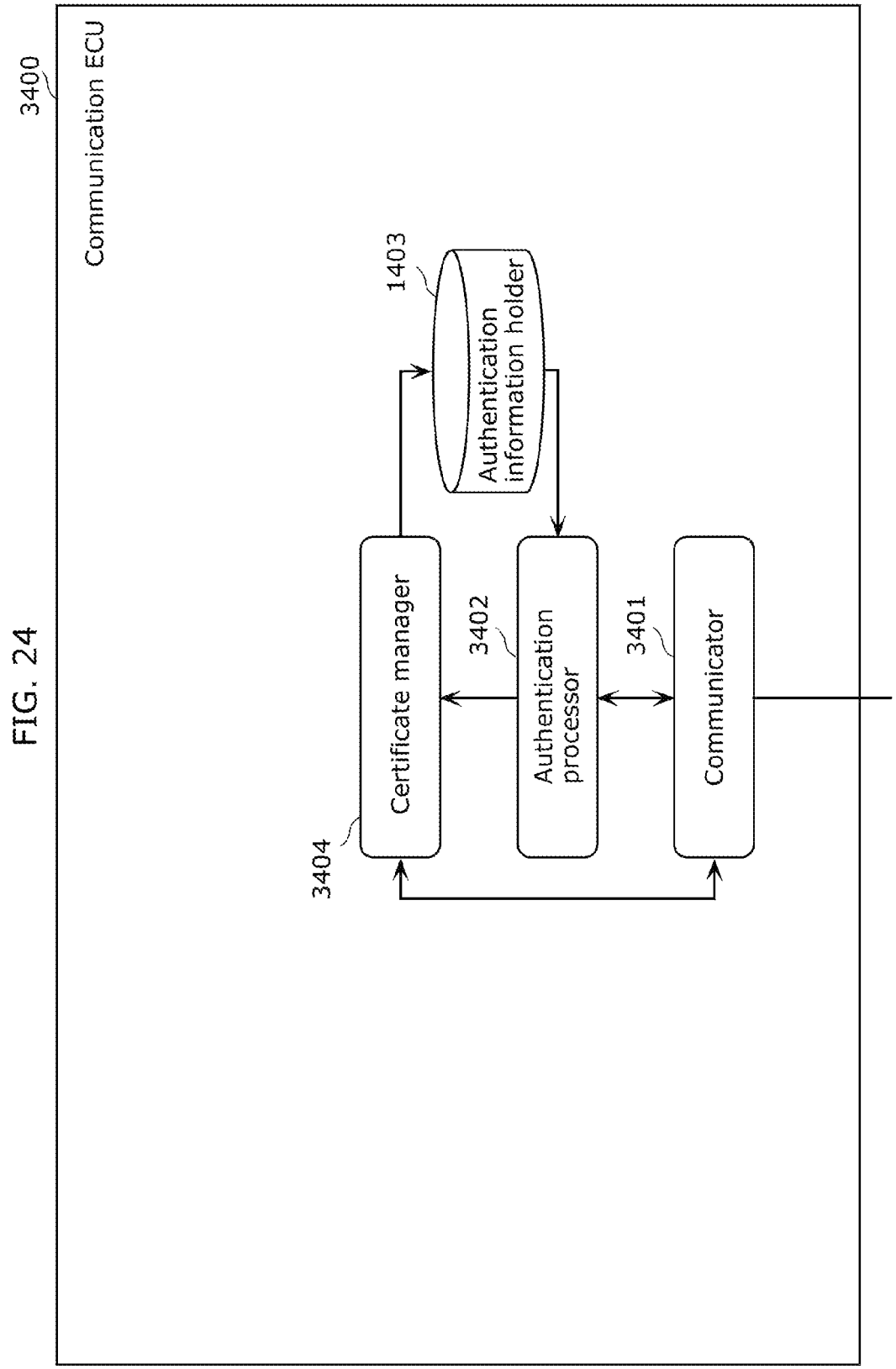
FIG. 24 illustrates an example of a configuration of a communication ECU of an external device according to Embodiment 3.

FIG. 24 illustrates an example of a configuration of communication ECU 3400 of external device 3002 according to Embodiment 3.

Communication ECU 3400 includes communicator 3401, authentication processor 3402, authentication information holder 1403, and certificate manager 3404. Communication ECU 3400 is an example of an authentication device included in external device 3002 of automated driving system 3000. The same structural components as those in Embodiment 1 are assigned the same numerals as in Embodiment 1, and are omitted from the following description.

Communicator 3401 communicates with vehicle 3001. For example, communicator 3401 performs wire communication with vehicle 3001. Moreover, communicator 3401 communicates with ECU 1100e and V2X communication ECU 2500 of external device 3002 via the in-vehicle network. Communicator 3401 notifies authentication processor 3402 and certificate manager 3404 of communication messages received from vehicle 3001 and server 2600. Moreover, communicator 3401 receives notification from authentication processor 3402 and certificate manager 3404, and transmits communication messages to vehicle 3001 and server 2600.

Authentication processor 3402 communicates with vehicle 3001 via communicator 3401 and performs authentication of vehicle 3001. Authentication processor 3402 is an example of an authenticator that authenticates vehicle 3001 using a first certificate that certifies validity of vehicle 3001. Authentication processor 3402 obtains information to be used for the authentication, from authentication information holder 1403. Moreover, authentication processor 3402 notifies certificate manager 3404 of a result of the authentication.

Certificate manager 3404 is an example of a manager that validates the third certificate in accordance with a result of the authentication performed by authentication processor 3402. In accordance with the result of the authentication notified by authentication processor 3402, certificate manager 3404 obtains the public key certificate (the third certificate), issued by server 2600, corresponding to a new driving automation level from server 2600 via communicator 3401. Then, certificate manager 3404 stores this third certificate into authentication information holder 1403. As a result, the third certificate is registered in authentication information holder 1403, so that this third certificate is validated in external device 3002. Furthermore, in accordance with a result of communication processing received from communicator 3401, certificate manager 3404 deletes the third certificate stored in authentication information holder 1403. As a result, the registration of the third certificate in authentication information holder 1403 is cancelled, so that the third certificate validated in external device 3002 is invalidated.

[3.4 Example of Sequence to Issue Certificate]

Figure 25:
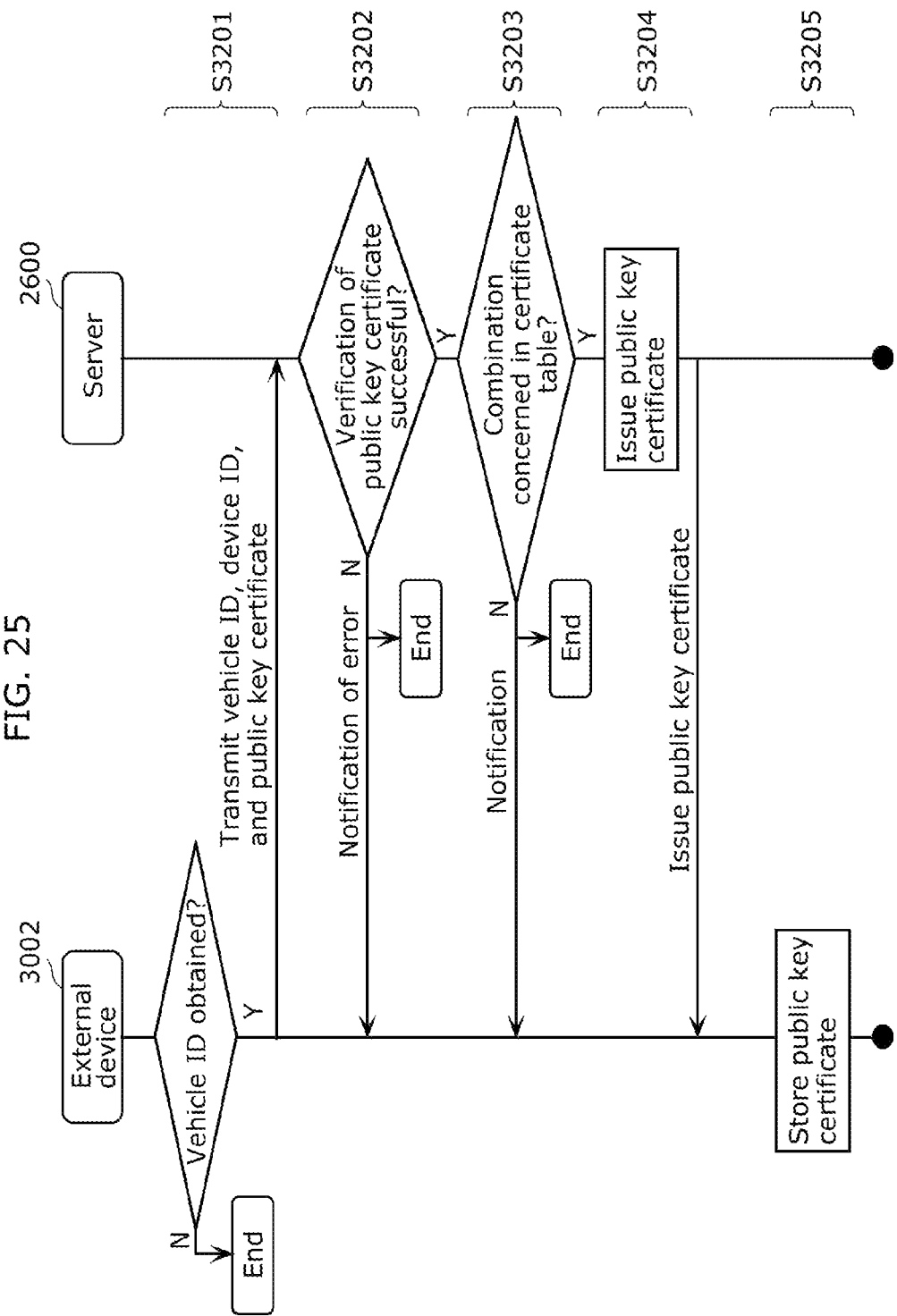
FIG. 25 is a sequence diagram illustrating an example of an operation performed to issue a public key certificate according to Embodiment 3.

Next, the following describes issuance of the third certificate by server 2600 corresponding to the driving automation level after mutual authentication between vehicle 3001 and external device 3002, with reference to FIG. 25.

The third certificate issued by server 2600 is held and validated in external device 3002.

FIG. 25 is a sequence diagram illustrating an example of an operation performed to issue the public key certificate (the third certificate) according to Embodiment 3.

External device 3002 determines whether the vehicle ID registered is obtainable (S3201). If no vehicle ID is registered, external device 3002 cannot obtain a vehicle ID (N in S3201). Because the authentication is not completed, the processing is ended. In this example, in contrast, the authentication in FIG. 8 has been completed and the vehicle ID has been registered.

If obtaining the vehicle ID of vehicle 3001 (Y in S3201), external device 3002 transmits the vehicle ID obtained, together with device ID of external device 3002, the public key certificate (the first certificate) of vehicle 3001, and the public key certificate (the second certificate) of external device 3002, to server 2600.

Receiving the device ID of external device 3002, the vehicle ID of vehicle 3001, and the public key certificates of two kinds, server 2600 verifies the signatures of these two kinds of public key certificates received (S3202). If the verification is unsuccessful (N in S3202), server 2600 notifies external device 3002 of an error and then ends the processing.

If the verification is successful (Y in S3202), server 2600 verifies whether a combination of the device ID and the vehicle ID received in S3202 is in the certificate table (S3203). If the received combination of the device ID and the vehicle ID is not in the certificate table (N in S3203), server 2600 notifies external device 3002 about this and ends the processing with an error.

If the received combination of the device ID and the vehicle ID is in the certificate table (Y in S3203), server 2600 issues a third certificate corresponding to the obtained combination and then transmits this third certificate to external device 3002 (S3204).

External device 3002 stores the third certificate issued by server 2600 (S3205). For example, the third certificate is stored in authentication information holder 1403 of communication ECU 3400 in external device 3002. As a result, this third certificate is also validated in external device 3002.

Although not illustrated, server 2600 outputs information about a system-wide driving automation level of automated driving system 3000 including the combination of vehicle 3001 and external device 3002 corresponding to the third certificate validated. Here, external device 3002 (or more specifically, communicator 3401) may output the information about the system-wide driving automation level of automated driving system 3000 including the combination of vehicle 3001 and external device 3002 corresponding to the third certificate validated.

[3.5 Example of Sequence to Invalidate Certificate]

Figure 26:
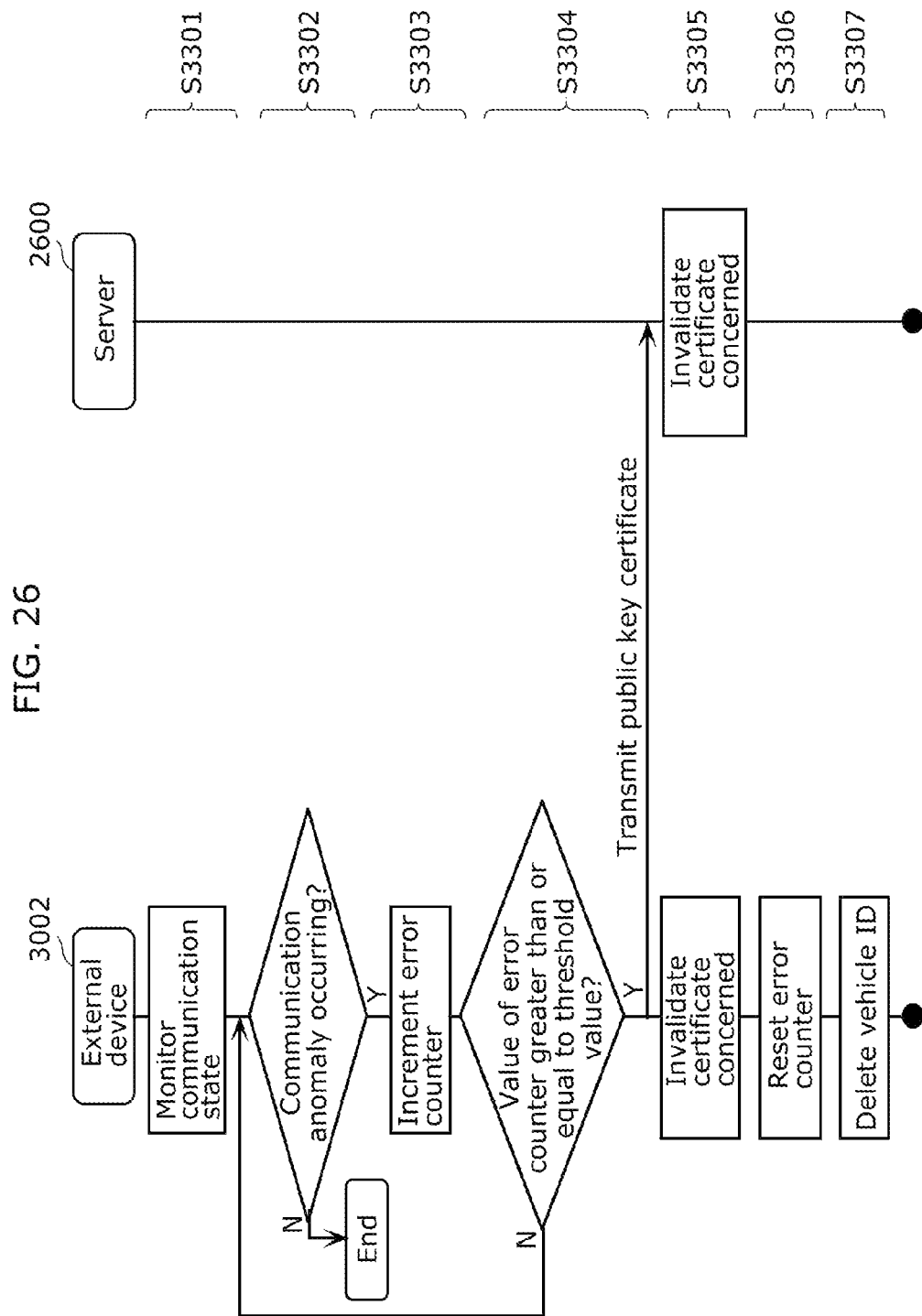
FIG. 26 is a sequence diagram illustrating an example of an operation performed to invalidate the public key certificate according to Embodiment 3.

Next, the following describes invalidation of the third certificates held in external device 3002 and server 2600 corresponding to the driving automation level, with reference to FIG. 26.

FIG. 26 is a sequence diagram illustrating an example of an operation performed to invalidate the public key certificate (the third certificate) according to Embodiment 3.

External device 3002 monitors a communication state between vehicle 3001 and external device 3002 (S3301).

External device 3002 determines whether the communication state between vehicle 3001 and external device 3002 is anomalous (S3302). If no communication anomaly is occurring (N in S3302), external device 3002 ends the processing.

If a communication anomaly is occurring (Y in S3302), external device 3002 increments an error counter (S3303).

External device 3002 determines whether a value of the error counter is greater than or equal to a threshold value (S3304). If the value of the error counter is greater than or equal to the threshold value (Y in S3304), external device 3002 notifies server 2600 of the issued public key certificate (the third certificate) and thereby instructs server 2600 to invalidate this third certificate. If the value of the error counter does not exceed the threshold value (N in S3304), external device 3002 returns to S3302.

If the value of the error counter is greater than or equal to the threshold value (Y in S3304), external device 3002 and server 2600 invalidate the respective third certificates stored (S3305). For example, certificate manager 3404 of communication ECU 3400 in external device 3002 invalidates the third certificate concerned by deleting the third certificate stored in authentication information holder 1403.

External device 3002 resets the error counter (S3306).

External device 3002 deletes the vehicle ID of the connection destination (S3307).

As described thus far, automated driving system 3000 according to Embodiment 3 includes server 2600. For device authentication, the third certificate is transmitted from server 2600 to external device 3002.

[3.6 Advantageous Effects According to Embodiment 3]

Automated driving system 3000 according to Embodiment 3 includes server 2600 that issues the third certificate different from the first certificate of vehicle 3001 and the second certificate of external device 3002. The third certificate issued is managed in external device 3002. Then, the third certificate is validated or invalidated depending on a result of communication between vehicle 3001 and external device 3002. Thus, an appropriate driving automation level can be determined for an operation performed by vehicle 3001 and external device 3002 cooperatively. Hence, the safety is ensured.

Variation of Embodiment 3

Automated driving system 3000 according to Embodiment 3 is capable of validating or invalidating the third certificate any time. However, timing of validation or invalidation may be controlled depending on a traveling state of vehicle 3001. This case is described as Variation of Embodiment 3. Note that points similar to those described in Embodiment 3 are omitted from description.

[3.7 Example of Sequence to Issue Certificate]

Figure 27:
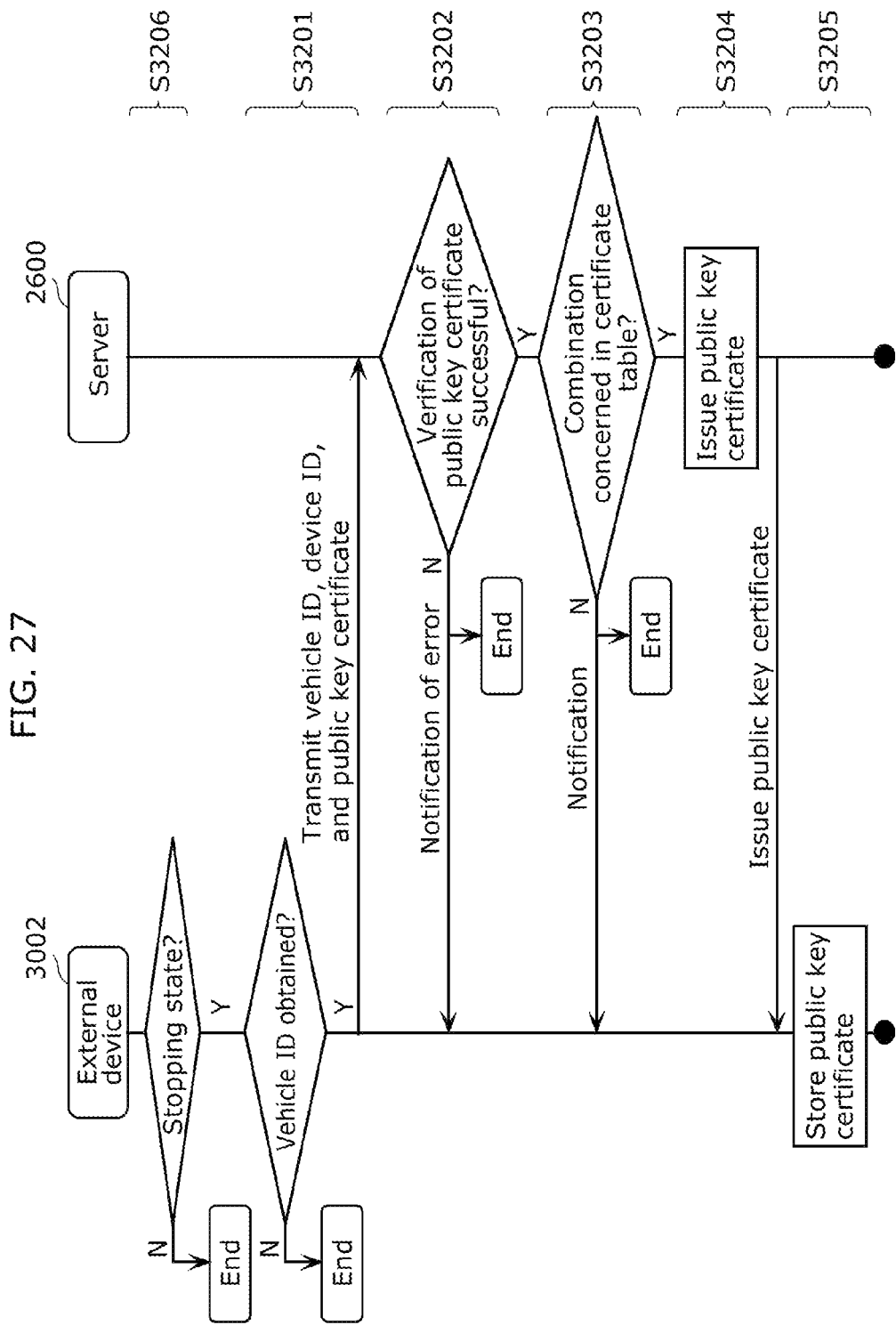
FIG. 27 is a sequence diagram illustrating an example of an operation performed to issue a public key certificate according to Variation of Embodiment 3.

FIG. 27 is a sequence diagram illustrating an example of an operation performed to issue a public key certificate (a third certificate) according to Variation of Embodiment 3. The third certificate is issued if the traveling state of vehicle 3001 satisfies a specific condition, according to Variation of Embodiment 3. Note that steps similar to those in Embodiment 3 are assigned the same step numbers as in Embodiment 3, and description on these steps is omitted here.

For example, the traveling state of vehicle 3001 that satisfies the specific condition is a stopping state. Before starting processing to validate the third certificate, external device 3002 determines whether vehicle 3001 is in the stopping state (S3206). If vehicle 3001 is not in the stopping state (N in S3206), external device 3002 ends the processing without starting the validation of the third certificate. If vehicle 3001 is in the stopping state (Y in S3206), external device 3002 starts the validation of the third certificate.

[3.8 Example of Sequence to Invalidate Certificate]

FIG. 28 is a sequence diagram illustrating an example of an operation performed to invalidate the public key certificate (the third certificate) according to Variation of Embodiment 3. The state (such as a communication state) between vehicle 3001 and external device 3002 is monitored if the traveling state of vehicle 3001 satisfies the specific condition, according to Variation of Embodiment 3. Then, the third certificate is invalidated depending on the communication state. Note that steps similar to those in Embodiment 3 are assigned the same step numbers as in Embodiment 3, and description on these steps is omitted here.

External device 3002 determines whether vehicle 3001 is in the stopping state (S3308). If vehicle 3001 is not in the stopping state (N in S3308), external device 3002 interrupts to end this invalidation performed for the third certificate. If vehicle 3001 is in the stopping state (Y in S3308), external device 3002 monitors the communication state (S3301) and continues the invalidation.

[3.9 Advantageous Effects of Variation of Embodiment 3]

Automated driving system 3000 according to Embodiment 3 includes server 2600 that issues the third certificate different from the first certificate of vehicle 3001 and the second certificate of external device 3002. The third certificate issued is managed in external device 3002. Then, the third certificate is validated or invalidated depending on the traveling state of vehicle 3001 in addition to a result of communication between vehicle 3001 and external device 3002. Thus, an appropriate driving automation level can be determined for an operation performed by vehicle 3001 and external device 3002 cooperatively. Hence, the safety is ensured.

Other Variations

Although the present disclosure has been described by way of Embodiments above, it should be obvious that the present disclosure is not limited to Embodiments described above. The following variations are also included in the present disclosure.

(1) Although Ethernet and the CAN protocol are used as the in-vehicle network in Embodiments above, this is not intended to be limiting. For example, CAN with flexible data rate (CAN-FD), local interconnect network (LIN), or media oriented systems transport (MOST) may be used as the in-vehicle network. Alternatively, a configuration of the in-vehicle network may include these networks combined as a subnetwork.

(2) Each of Embodiments above describes a case where the vehicle or the external device manages the third certificate newly validated. However, this is not intended to be limiting. The vehicle and the external device may have the same third certificate. Alternatively, each of the vehicle and the external device has a different kind of certificate depending on the purpose.

(3) Each of Embodiments describes a case where the communication ECU in charge of communication between the vehicle and the external device includes the certificate manager that performs authentication and manages the certificates. This is not intended to be limiting. The certificate manager may be separately included in an ECU specifically for certificate management. Alternatively, the certificate manager may be included in the automated driving ECU or a different ECU. In Embodiments 2 and 3 above, the certificate manager may be included in the V2X communication ECU.

(4) Although the communication ECU determines an anomaly according to Embodiments above, this is not intended to be limiting. Communication details may be mirrored to a different ECU. Then, this different ECU may determine an anomaly. This different ECU may be physically or logically different from the communication ECU. For example, a virtual environment may be created on a multi-function ECU referred to as a central gateway, a zone ECU, or a domain controller. Then, an application that monitors the communication state may be provided for a virtual operating system (hereinafter, referred to as the OS) of this multi-function ECU. Moreover, a similar virtual environment may be created on the communication ECU so that the communication state can be monitored by an OS different from the OS in charge of the communication.

(5) Each of Embodiments above describes a case where the state between the vehicle and the external device refers to the communication state between the vehicle and the external device. However, this is not intended to be limiting. For example, the external device according to Embodiment 3 may detect a fault of the external device itself and notify the vehicle or the server of the fault.

(6) In each of Embodiments 2 and 3, the server is the certificate authority that newly issues the public key certificate (the third certificate). This is not intended to be limiting. For example, the server may previously obtain and store a certificate issued previously by a different certificate authority. Then, the server may only transmit this certificate to the vehicle or the external device at an appropriate timing.

(7) In Embodiments above, the combination of the vehicle and the external device is certified and the driving automation level is determined, by reference to the certificate table. However, the system-wide driving automation level of the automated driving system including the combination may be previously included in the certificate. To be more specific, information similar to the certificate table may be already included in the certificate. Thus, the system-wide driving automation level of the automated driving system may be determined without reference to the certificate table.

(8) In Variations of Embodiments above, the traveling state of the vehicle is determined. The traveling state may be determined by a specific ECU and then the other ECUs may obtain this traveling state via the in-vehicle network. Alternatively, each of the ECUs may determine the traveling state independently. In addition to the traveling states including moving, stopping, and parking states, different states including accessory-ON, ignition-ON, slowly-moving, and fast-moving states may be determined.

(9) Each of Variations of Embodiments above describes a case where the third certificate is validated only in the stopping state. However, this is not intended to be limiting. For example, the certificate may be validated in a specific traveling state, such as a parking or moving state, other than the stopping state. Alternatively, the validation may be allowed in the parking state unless the vehicle is in the ignition-ON state. Moreover, the validation may be performed when the traveling state changes from the traveling state to the stopping state or from the stopping state to the parking state, for example.

(10) Each of Variations of Embodiments above describes a case where the third certificate is invalidated only in the stopping state. However, this is not intended to be limiting. For example, the certificate may be invalidated in a specific traveling state, such as a parking or moving state, other than the stopping state. Alternatively, the third certificate may be invalidated when the traveling state changes from the stopping state to the moving state or from the slowly-moving state to the fast-moving state, for example.

(11) In each of Variations of Embodiments above, the third certificate is invalidated, or more specifically, the driving automation level is changed, in accordance with the result of communication. However, the driver may be notified about this at the timing of change. Such notification may be provided for an ECU having a display device, such as an infotainment system or a speed indicator. Then, a pup-up or icon may be displayed for the driver at the timing of change, or may be deleted or changed for instance.

(12) Each of the above-described devices and systems may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute functions of the devices and systems. Here, the computer program includes combinations of instruction codes for issuing instructions to the computer to execute predetermined functions.

(13) A part or all of the constituent elements in each of the devices and systems according to the above embodiments may be implemented into a single Large-Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing each of the constituent elements to execute their functions.

Each of the constituent elements in each of the devices and systems may be formed as separate chips, or may be formed as one chip so as to include the entire configuration or part of the configuration.

The terminology "system LSI circuit" depends on the degree of integration, and may also referred to as IC, LSI circuit, super LSI circuit, or ultra-LSI circuit. Moreover, the method of circuit integration is not limited to LSI. Integration may be realized with a specialized circuit or a general-purpose processor. After the LSI circuit is manufactured, a field programmable gate array (FPGA) or a reconfigurable processor capable of reconfiguring the connections and settings of the circuit cells in the LSI circuit may be used.

Further, if an integrated circuit technology that replaces LSI emerges from advances in or derivations of semiconductor technology, integration of functional blocks using such technology may also be used. Application of biotechnology is also a possibility.

(14) It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(15) The present disclosure may be an authentication method.

For example, an authentication method is used by an automated driving system that includes a vehicle and an external device, the external device communicating with the vehicle to cause the vehicle to implement automated driving. The vehicle holds a first certificate that certifies validity of the vehicle. The external device holds a second certificate that certifies validity of the external device. The authentication method includes validating a third certificate that certifies validity of a combination of the vehicle and the external device, in accordance with a result of device authentication performed between the vehicle and the external device by reference to the first certificate and the second certificate (S1201 to S1203 in FIG. 9, for example).

The present disclosure may be a computer program executed by a computer to perform the authentication method, or digital signals forming the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray(registered trademark) Disc), and a semiconductor memory. The present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

The program or the digital signals may be recorded onto the recording medium to be transferred, or may be transmitted via a network or the like, so that the program or the digital signals can be executed by a different independent computer system.

(16) The present disclosure may be any combination of the above-described embodiments and variations.

INDUSTRIAL APPLICABILITY

The present disclosure is applicable to an automated driving system that includes a vehicle and an external device that communicates with the vehicle to cause the vehicle to implement automated driving.

The invention claimed is:

1. An authentication method used by an automated driving system that includes a vehicle and an external device, the external device communicating with the vehicle to cause the vehicle to implement automated driving,
the external device being attached to the vehicle,
the vehicle holding a first certificate that certifies validity of the vehicle,
the external device holding a second certificate that certifies validity of the external device,
the authentication method comprising:
validating a third certificate that certifies validity of a combination of the vehicle and the external device, in accordance with a result of device authentication performed between the vehicle and the external device by reference to the first certificate and the second certificate, wherein
the third certificate indicates a system-wide driving automation level of the automated driving system corresponding to the combination of the vehicle and the external device attached to the vehicle.

2. The authentication method according to claim 1, further comprising:
outputting information about a system-wide driving automation level of the automated driving system including the combination of the vehicle and the external device corresponding to the third certificate validated.

3. The authentication method according to claim 1,
wherein the validating includes validating the third certificate corresponding to at least one of a vehicle identification (ID) of the vehicle and a device ID of the external device, the vehicle ID and the device ID being obtained as the result of the device authentication.

4. The authentication method according to claim 1,
wherein the third certificate is issued during manufacturing of the vehicle and thus previously held in the vehicle.

5. The authentication method according to claim 1,
wherein the automated driving system further includes a server, and
the third certificate is transmitted from the server to one of the vehicle and the external device when the device authentication is performed.

6. The authentication method according to claim 1,
wherein the validating includes validating the third certificate if a traveling state of the vehicle satisfies a specific condition.

7. The authentication method according to claim 6,
wherein the traveling state of the vehicle that satisfies the specific condition is a stopping state.

8. The authentication method according to claim 1, further comprising:
monitoring a state between the vehicle and the external device; and
invalidating the third certificate depending on a change in the state.

9. The authentication method according to claim 8,
wherein the state is a communication state between the vehicle and the external device, and
the invalidating includes invalidating the third certificate if the communication state is anomalous.

10. The authentication method according to claim 8,
wherein the monitoring includes monitoring the state if a traveling state of the vehicle satisfies a specific condition.

11. The authentication method according to claim 10,
wherein the traveling state of the vehicle that satisfies the specific condition is a stopping state.

12. An authentication system in an automated driving system that includes a vehicle and an external device, the external device communicating with the vehicle to cause the vehicle to implement automated driving,
the external device being attached to the vehicle,
the vehicle holding a first certificate that certifies validity of the vehicle,
the external device holding a second certificate that certifies validity of the external device,
the authentication system comprising:
a manager that validates a third certificate that certifies validity of a combination of the vehicle and the external device, in accordance with a result of device authentication performed between the vehicle and the external device by reference to the first certificate and the second certificate,
wherein the third certificate indicates a system-wide driving automation level of the automated driving system corresponding to the combination of the vehicle and the external device attached to the vehicle.

13. An authentication device included in a vehicle of an automated driving system that includes the vehicle and an external device, the external device communicating with the vehicle to cause the vehicle to implement automated driving,
the external device being attached to the vehicle,
the authentication device comprising:
a holder that holds a first certificate that certifies validity of the vehicle;
an authenticator that performs authentication of the external device by reference to a second certificate that certifies validity of the external device; and
a manager that validates a third certificate that certifies validity of a combination of the vehicle and the external device, in accordance with a result of the authentication,
wherein the third certificate indicates a system-wide driving automation level of the automated driving system corresponding to the combination of the vehicle and the external device attached to the vehicle.

14. An authentication device included in an external device of an automated driving system that includes a vehicle and the external device, the external device communicating with the vehicle to cause the vehicle to implement automated driving,
the external device being attached to the vehicle,
the authentication device comprising:
a holder that holds a second certificate that certifies validity of the external device;
an authenticator that performs authentication of the vehicle by reference to a first certificate that certifies validity of the vehicle; and
a manager that validates a third certificate that certifies validity of a combination of the vehicle and the external device, in accordance with a result of the authentication,
wherein the third certificate indicates a system-wide driving automation level of the automated driving system corresponding to the combination of the vehicle and the external device attached to the vehicle.

* * * * *